US012454136B2

(12) United States Patent
Sato et al.

(10) Patent No.: US 12,454,136 B2
(45) Date of Patent: Oct. 28, 2025

(54) LIQUID EJECTION HEAD AND LIQUID EJECTION APPARATUS

(71) Applicant: CANON KABUSHIKI KAISHA, Tokyo (JP)

(72) Inventors: Ryo Sato, Tokyo (JP); Kyosuke Toda, Kanagawa (JP); Takeho Miyashita, Kanagawa (JP); Shimpei Yoshikawa, Kanagawa (JP); Chiaki Muraoka, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 65 days.

(21) Appl. No.: 18/197,502

(22) Filed: May 15, 2023

(65) Prior Publication Data

US 2023/0364919 A1 Nov. 16, 2023

(30) Foreign Application Priority Data

May 16, 2022 (JP) ................................ 2022-080217

(51) Int. Cl.

| | |
|---|---|
| ***B41J 2/175*** | (2006.01) |
| ***B41J 2/045*** | (2006.01) |
| ***B41J 2/14*** | (2006.01) |
| ***C09D 11/322*** | (2014.01) |

(52) U.S. Cl.

CPC ....... *B41J 2/17596* (2013.01); *B41J 2/04563* (2013.01); *B41J 2/14032* (2013.01); *B41J 2/0458* (2013.01); *B41J 2/04581* (2013.01); *B41J 2202/12* (2013.01); *C09D 11/322* (2013.01)

(58) Field of Classification Search

CPC . B41J 2/18; B41J 2/175; B41J 2/17596; B41J 2202/12; B41J 2/14145; B41J 29/38; B41J 2/17556; B41J 2/04563; B41J 2/14032; B41J 2/0458; B41J 2/04581; B41J 2/14024

See application file for complete search history.

(56) References Cited

U.S. PATENT DOCUMENTS

2020/0070521 A1* 3/2020 Arimura .............. B41J 2/16517
2021/0394525 A1* 12/2021 Yamada ............... B41J 2/17596

FOREIGN PATENT DOCUMENTS

JP 2018-024254 A 2/2018

* cited by examiner

*Primary Examiner* — Jannelle M Lebron
(74) *Attorney, Agent, or Firm* — Venable LLP

(57) ABSTRACT

In a circulation channel, which is configured at least with an ejection unit, a first pressure adjusting unit, a second pressure adjusting unit, a pump, and a temperature adjusting unit, liquid supplied from the outside flows into the first pressure adjusting unit and then flows out of the first pressure adjusting unit into the ejection unit and the second pressure adjusting unit. The liquid that has flowed out of the ejection unit and the liquid that has flowed out of the first pressure adjusting unit flow into the second pressure adjusting unit and then flow out of the second pressure adjusting unit into the pump. The pump sends the liquid that has flowed out of the second pressure adjusting unit to the first pressure adjusting unit, and the temperature of the circulating liquid is adjusted by the temperature adjusting unit.

14 Claims, 22 Drawing Sheets

LIQUID EJECTION HEAD AND LIQUID EJECTION APPARATUS

BACKGROUND OF THE INVENTION

Field of the Invention

The present invention relates to a liquid ejection head that can be widely applied as a print head capable of ejecting ink in an inkjet system, for example, and to a liquid ejection apparatus equipped with the liquid ejection head.

Description of the Related Art

Japanese Patent Laid-Open No. 2018-024254 discloses a configuration in which an independently-configured sub-tank is installed between a print head, which ejects ink in an inkjet method, and an ink tank, which stores the ink, so that the ink is circulated between the sub-tank and the print head.

By the way, for such an inkjet printing apparatus, in recent years, it is required to easily perform high-quality printing not only on ordinary paper but also on a print medium such as a resin film with no ink absorbency. Although industrial inks with high viscosity are used for print media with no ink absorbency or the like, if such inks are to be ejected with the high viscosity, ejection failures in which the inks cannot be properly ejected may occur.

Ink generally has the characteristic that its viscosity varies with temperature. Therefore, it is conceivable to suppress the occurrence of ejection failures by adjusting the temperature of the circulating ink. However, in the case of such a configuration in which ink is circulated as disclosed in Japanese Patent Laid-Open No. 2018-024254, it is necessary to adjust the temperature of the ink in the sub-tank, the print head, and the channel connecting these to a temperature within a predetermined range, and thus it takes time to adjust the temperature of the ink, which results in a decrease in productivity.

SUMMARY OF THE INVENTION

The present invention has been made in view of the above-described problems, so as to provide a technique capable of suppressing ejection failures of ink while suppressing a decrease in productivity.

In the first aspect of the present disclosure, there is provided a liquid ejection head including:

an ejection unit configured to eject supplied liquid;

a first pressure adjusting unit configured to be controlled to have a predetermined pressure;

a second pressure adjusting unit configured to be controlled to have a lower pressure than the predetermined pressure;

a pump configured to send liquid; and a temperature adjusting unit configured to adjust a temperature of liquid, wherein a circulation channel for circulating liquid is included, the circulation channel being configured at least with the ejection unit, the first pressure adjusting unit, the second pressure adjusting unit, the pump, and the temperature adjusting unit, and wherein, in the circulation channel, liquid supplied from an outside flows into the first pressure adjusting unit and then is flowed out of the first pressure adjusting unit into the ejection unit and the second pressure adjusting unit, the liquid flowed out of the ejection unit and the liquid flowed out of the first pressure adjusting unit flow into the second pressure adjusting unit and then are flowed out of the second pressure adjusting unit into the pump, the pump sends the liquid flowed in from the second pressure adjusting unit to the first pressure adjusting unit, and the temperature of the circulating ink is adjusted by the temperature adjusting unit.

In the second aspect of the present disclosure, there is provided a liquid ejection apparatus including a liquid ejection head, the liquid ejection head including:

an ejection unit configured to eject supplied liquid;

a first pressure adjusting unit configured to be controlled to have a predetermined pressure;

a second pressure adjusting unit configured to be controlled to have a lower pressure than the predetermined pressure;

a pump configured to send liquid; and a temperature adjusting unit configured to adjust a temperature of liquid, wherein a circulation channel for circulating liquid is included, the circulation channel being configured at least with the ejection unit, the first pressure adjusting unit, the second pressure adjusting unit, the pump, and the temperature adjusting unit, and wherein, in the circulation channel, liquid supplied from an outside flows into the first pressure adjusting unit and then is flowed out of the first pressure adjusting unit into the ejection unit and the second pressure adjusting unit, the liquid flowed out of the ejection unit and the liquid flowed out of the first pressure adjusting unit flow into the second pressure adjusting unit and then are flowed out of the second pressure adjusting unit into the pump, the pump sends the liquid flowed in from the second pressure adjusting unit to the first pressure adjusting unit, and the temperature of the circulating ink is adjusted by the temperature adjusting unit.

In the third aspect of the present disclosure, there is provided a liquid ejection apparatus including a liquid ejection head, the liquid ejection head including:

an ejection unit configured to eject supplied liquid;

a first pressure adjusting unit configured to be controlled to have a predetermined pressure;

a second pressure adjusting unit configured to be controlled to have a lower pressure than the predetermined pressure;

a pump configured to send liquid; and a temperature adjusting unit configured to adjust a temperature of liquid, wherein a circulation channel for circulating liquid is included, the circulation channel being configured at least with the ejection unit, the first pressure adjusting unit, the second pressure adjusting unit, the pump, and the temperature adjusting unit, wherein, in the circulation channel, liquid supplied from an outside flows into the first pressure adjusting unit and then is flowed out of the first pressure adjusting unit into the ejection unit and the second pressure adjusting unit, the liquid flowed out of the ejection unit and the liquid flowed out of the first pressure adjusting unit flow into the second pressure adjusting unit and then are flowed out of the second pressure adjusting unit into the pump, the pump sends the liquid flowed in from the second pressure adjusting unit to the first pressure adjusting unit, and the temperature of the circulating ink is adjusted by the temperature adjusting unit, wherein the ejection unit includes an ejection port configured to eject liquid, a pressure chamber formed so as to correspond to an ejection element that generates energy for ejecting liquid from the ejection port, a supply channel configured to supply liquid to the pressure chamber, and a collection channel configured to collect liquid from the pressure chamber, wherein the temperature adjusting unit is installed at a position adjacent to at least one of the supply channel and the collection channel, wherein a cap member configured to cap a surface of the liquid ejection head from which the liquid is ejected is provided, and wherein, in a case where at least one of the pump and the temperature adjusting unit is being driven, the ejection unit is protected with the cap member.

According to the present invention, it is possible to suppress ejection failures of ink while suppressing a decrease in productivity.

Further features of the present invention will become apparent from the following description of exemplary embodiments with reference to the attached drawings.

DESCRIPTION OF THE EMBODIMENTS

Hereinafter, detailed explanations are given of preferred embodiments of the present disclosure with reference to the accompanying drawings. Not that the following embodiments are not intended to limit the contents of the present disclosure, and every combination of the characteristics explained in the present embodiments is not necessarily essential to the solution in the present disclosure. Note that the same reference numbers are given to the same constituent elements. In the example for the explanation of the present embodiments, although a thermal system in which liquid is ejected by generating air bubbles with an electrothermal converting element is employed as an ejection element that ejects liquid, there is not a limitation as such. The present embodiments can also be applied to a liquid ejection head that employs an ejection system that ejects liquid using a piezoelectric element (piezo) or another ejection system. Furthermore, the pumps, pressure adjusting unit, etc., explained below are also not limited to the configurations themselves described in the embodiments and drawings. In the following explanation, the basic configuration of the present disclosure is described first, and then the characteristic parts of the present disclosure are explained.

<Liquid Ejection Apparatus>

Figure 1A:
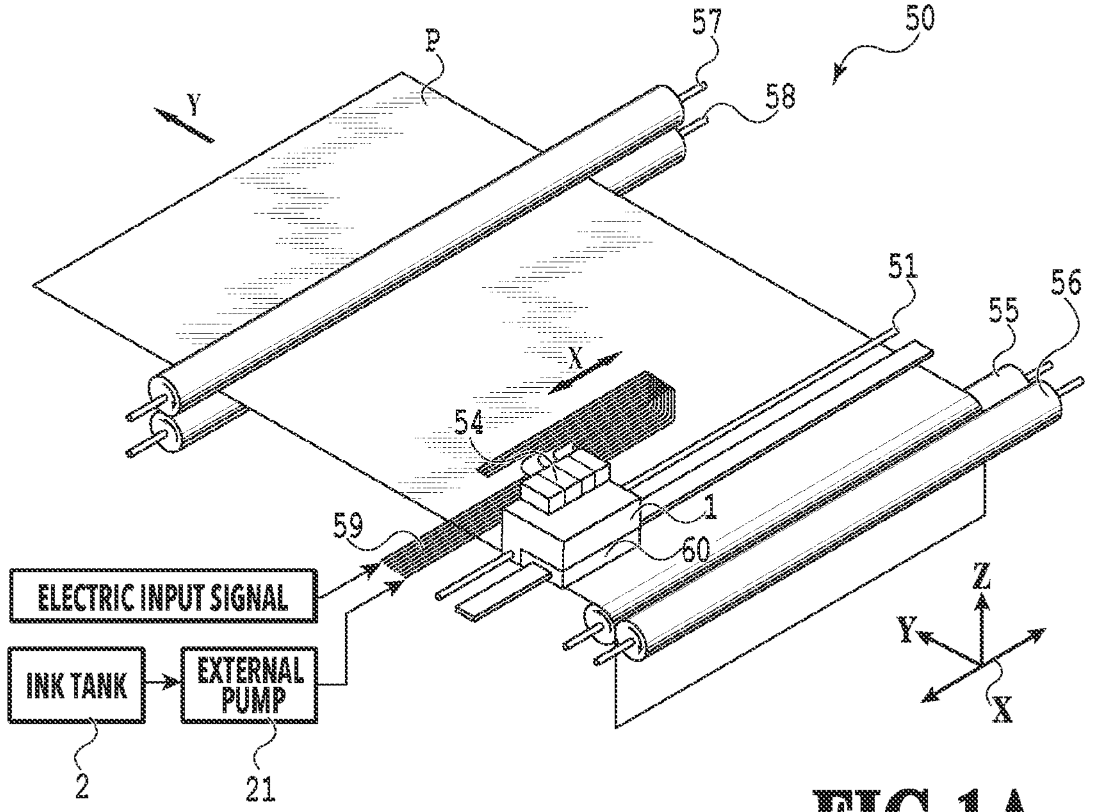
FIG. 1A and FIG. 1B are diagrams for explaining a liquid ejection apparatus.
Figure 1B:
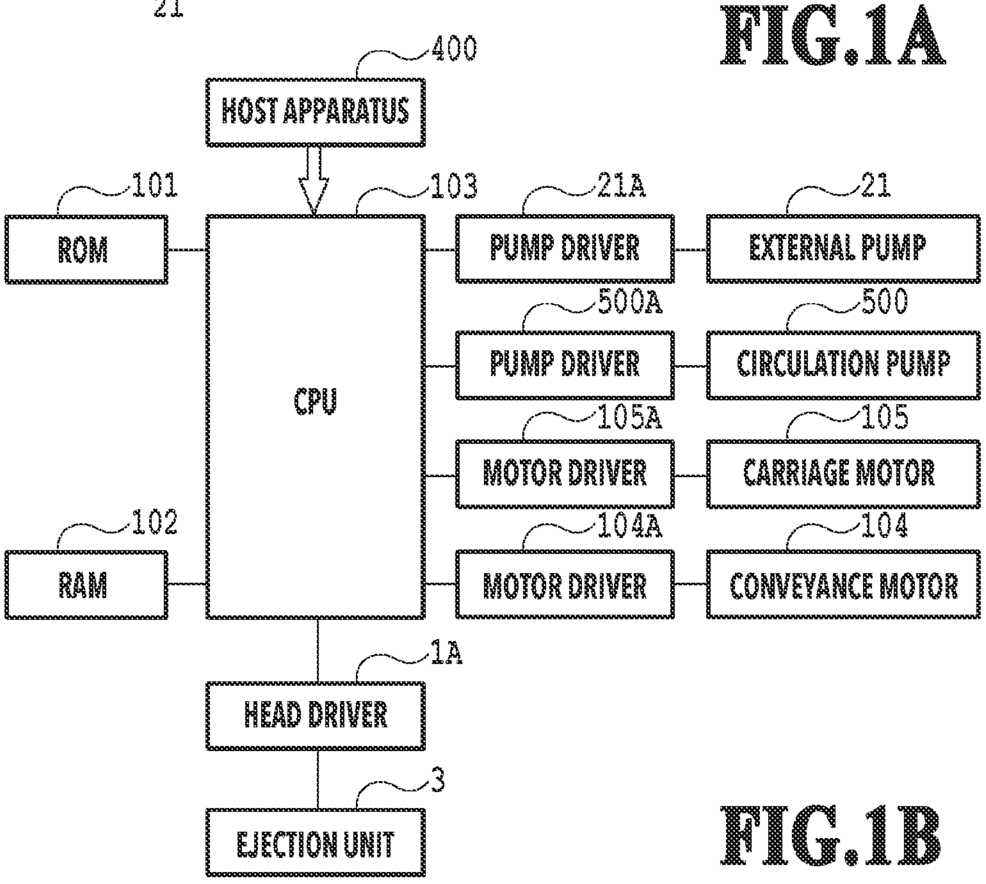

FIG. 1A and FIG. 1B are diagrams for explaining a liquid ejection apparatus and are enlarged views of a liquid ejection head of the liquid ejection apparatus and its surroundings. First, an overall configuration of the liquid ejection apparatus 50 according to the present embodiments is explained with reference to FIG. 1A and FIG. 1B. FIG. 1A is a perspective view schematically illustrating a liquid ejection apparatus in which the liquid ejection head 1 is used. The liquid ejection apparatus 50 of the present embodiments configures a serial type inkjet printing apparatus that ejects ink, which is liquid, while performing scanning with the liquid ejection head 1 so as to perform printing on the print medium P.

The liquid ejection head 1 is mounted on the carriage 60. The carriage 60 reciprocates along the guide shaft 51 in the main-scanning direction (X direction). The print medium P is conveyed by the conveyance rollers 55, 56, 57, and 58 in the sub-scanning direction (Y direction) that intersects the main-scanning direction (perpendicularly in the present example). Note that, in each drawing referred to below, the Z direction indicates the vertical direction and intersects (perpendicularly in the present example) the X-Y plane, which is defined by the X direction and Y direction. The liquid ejection head 1 is configured to be detachable from and attachable to the carriage 60 for the user.

The liquid ejection head 1 is configured with the circulation unit 54 and the later-described ejection unit 3 (see FIG. 2). Although the specific configuration is described later, the ejection unit 3 is equipped with multiple ejection ports and energy-generating elements (hereinafter referred to as ejection elements) that generate ejection energy for ejecting liquid from the respective ejection ports.

Further, the liquid ejection apparatus 50 is equipped with the ink tank 2 as an ink supply source and the external pump 21, and the ink stored in the ink tank 2 is supplied to the circulation unit 54 via the ink supply tube 59 by the driving force of the external pump 21.

The liquid ejection apparatus 50 repeatedly performs a printing operation, in which the liquid ejection head 1 mounted on the carriage 60 ejects ink while moving in the main-scanning direction so as to perform printing, and a conveyance operation, in which the print medium P is conveyed in the sub-scanning direction, so that a predetermined image is formed on the print medium P. Note that the liquid ejection head 1 in the present embodiments can eject four types of ink, i.e., black (B), cyan (C), magenta (M), and yellow (Y), and it is possible to print a full-color image with these inks. However, the ink that can be ejected from the liquid ejection head 1 is not limited to the above-mentioned four types of ink. The present disclosure is also applicable to liquid ejection heads for ejecting other types of ink. That is, the types and number of inks ejected from the liquid ejection head are not limited.

Further, the liquid ejection apparatus 50 is equipped with the cap member 61 capable of covering the ejection port surface, on which the ejection ports of the liquid ejection head are formed, at a position away from the conveyance path of the print medium P in the X direction. The cap member 61 covers the ejection port surface of the liquid ejection head 1 during the non-printing operation to be used for preventing the ejection ports from drying out, for protecting the ejection ports, for an ink suction operation, etc.

Note that, regarding the liquid ejection head 1 illustrated in FIG. 1A, although the four circulation units 54 corresponding to the four types of ink are included in the liquid ejection head 1 as the example, it is sufficient as long as the circulation unit 54 that corresponds to the types of liquid to be ejected is included. Further, it is also possible to include multiple circulation units 54 for the same type of liquid. That is, the liquid ejection head 1 can be configured with one or more circulation units. It is also possible to circulate only at least one type of ink without circulating all of the four types of ink.

FIG. 1B is a block diagram illustrating a control system of the liquid ejection apparatus 50. The CPU 103 functions as a control unit for controlling the operation of each part of the liquid ejection apparatus 50, based on programs such as processing procedures stored in the ROM 101. The RAM 102 is used as a work area or the like for the CPU 103 to execute processing. The CPU 103 receives image data from the host apparatus 400 outside the liquid ejection apparatus 50 to control the head driver 1A and control driving of the ejection elements installed in the ejection unit 3. Further, the CPU 103 controls drivers of various actuators installed in the liquid ejection apparatus. For example, the CPU 103 controls the motor driver 105A of the carriage motor 105 for moving the carriage 60, the motor driver 104A of the conveyance motor 104 for conveying the print medium P, etc. Furthermore, the CPU 103 controls the pump driver 500A that drives the later-described circulation pump 500 and the pump driver 21A of the external pump 21. Note that, although the processing upon receiving image data from the host apparatus 400 is performed in the form illustrated in FIG. 1B, it is also possible to perform processing in the liquid ejection apparatus 50 without depending on data from the host apparatus 400.

<Basic Configuration of the Liquid Ejection Head>

Figure 2:
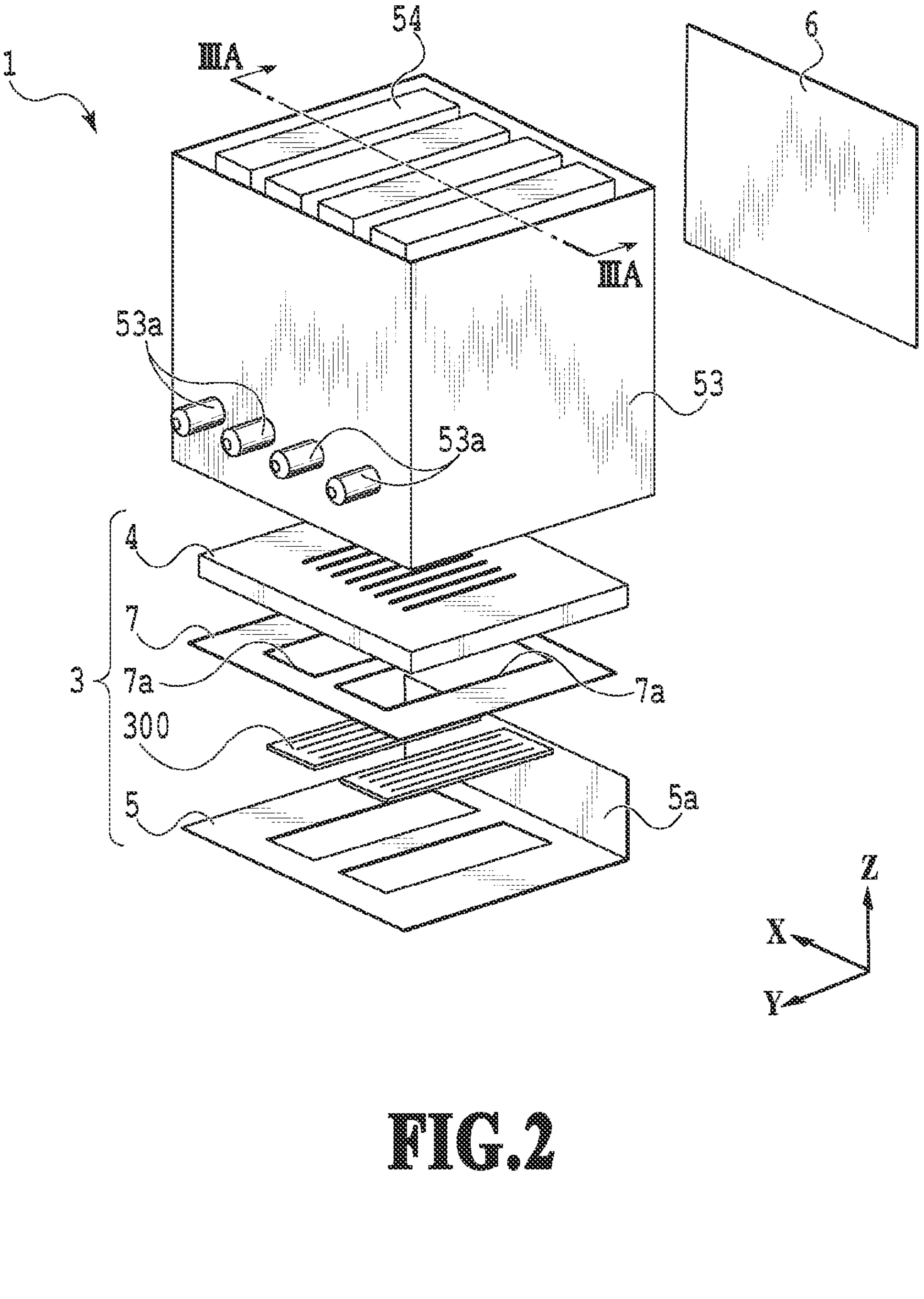
FIG. 2 is an exploded perspective view of a liquid ejection head.
Figure 3A:
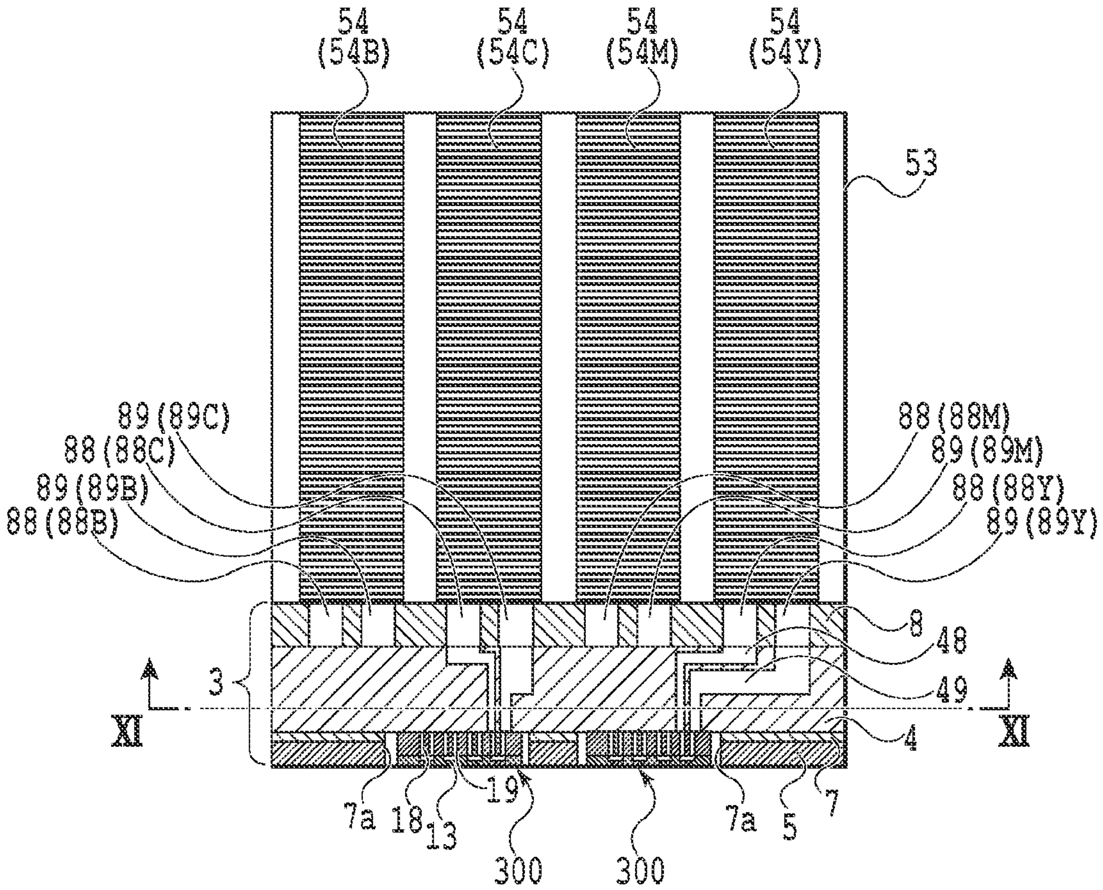
FIG. 3A and FIG. 3B are a vertical cross section of the liquid ejection head and an enlarged cross-sectional view of an ejection module.
Figure 3B:
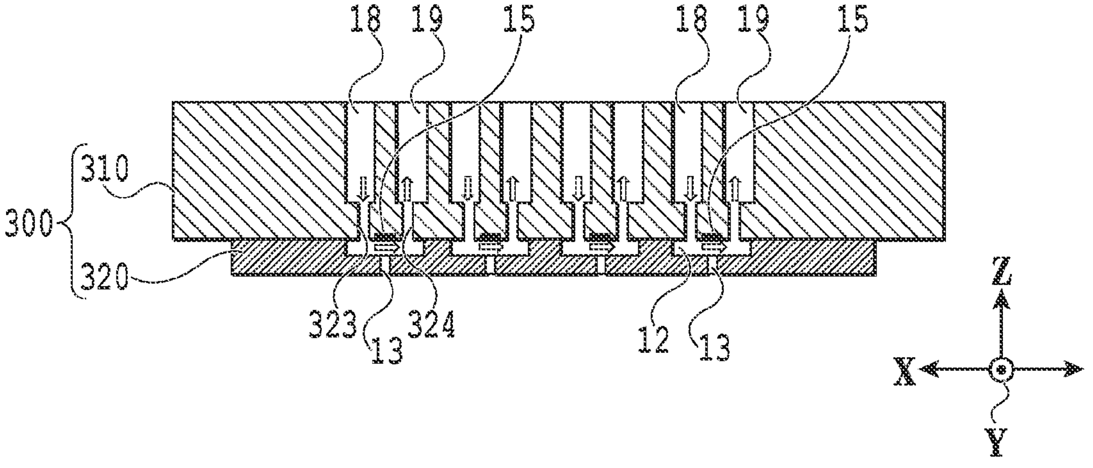

FIG. 2 is an exploded perspective view of the liquid ejection head 1 of the present embodiments. FIG. 3A and FIG. 3B are cross-sectional views taken along line IIIA-IIIA of the liquid ejection head 1 illustrated in FIG. 2. FIG. 3A is an overall vertical cross-sectional view of the liquid ejection head 1, and FIG. 3B is an enlarged view of the ejection module illustrated in FIG. 3A. Hereinafter, focusing on FIG. 2 to FIG. 3B, an explanation is given of the basic configuration of the liquid ejection head 1 according to the present embodiments with reference to FIG. 1A and FIG. 1B.

As illustrated in FIG. 2, the liquid ejection head 1 is configured with the circulation unit 54 and the ejection unit 3 for ejecting ink supplied from the circulation unit 54 onto the print medium P. The liquid ejection head 1 in the present embodiments is fixedly supported on the carriage 60 by a positioning unit and electrical contacts (not illustrated in the drawings) installed on the carriage 60 of the liquid ejection apparatus 50. The liquid ejection head 1 performs printing on the print medium P by ejecting ink while moving in the main-scanning direction (X direction) illustrated in FIG. 1A and FIG. 1B together with the carriage 60.

The external pump 21 connected to the ink tank 2, which serves as an ink supply source, is equipped with the ink supply tube 59 (see FIG. 1A and FIG. 1B). A liquid connector (not illustrated in the drawings) is installed at the tip of this ink supply tube 59. If the liquid ejection head 1 gets mounted on the liquid ejection apparatus 50, the liquid connector installed at the tip of the ink supply tube 59 is airtightly connected to the liquid connector inlet 53*a*, which is installed in the head case 53 of the liquid ejection head 1 as an inlet of liquid. Thus, an ink supply path from the ink tank 2 to the liquid ejection head 1 via the external pump 21 is formed. Since four types of ink are used in the present embodiments, four sets of the ink tank 2, the external pump 21, the ink supply tube 59, and the circulation unit 54 corresponding to the respective inks are installed, so that four ink supply paths corresponding to the respective inks are formed independently. In this way, the liquid ejection apparatus 50 of the present embodiments includes an ink supply system that supplies ink from the ink tank 2 which is installed outside the liquid ejection head 1. Note that the liquid ejection apparatus 50 of the present embodiments does not include an ink collection system for collecting the ink inside the liquid ejection head 1 to the ink tank 2. Therefore, although the liquid ejection head 1 is equipped with the liquid connector inlet 53*a* to which the ink supply tube 59 of the ink tank 2 is connected, but not with a connector inlet to which a tube for collecting the ink in the liquid ejection head 1 to the ink tank 2. Note that the liquid connector inlet 53*a* is installed for each ink.

In FIG. 3A and FIG. 3B, 54B indicates a circulation unit for black ink, 54C indicates a circulation unit for cyan ink, 54M indicates a circulation unit for magenta ink, and 54Y indicates a circulation unit for yellow ink, respectively. Each circulation unit has substantially the same configuration, and, in the present embodiments, each circulation unit is referred to as the circulation unit 54 unless otherwise distinguished.

In FIG. 2 and FIG. 3A, the ejection unit 3 includes the two ejection modules 300, the first support member 4, the second support member 7, the electric wiring member (electric wiring tape) 5, and the electric contact substrate 6. As illustrated in FIG. 3B, the ejection module 300 includes the silicon substrate 310 with a thickness of 0.5 to 1 mm and the multiple ejection elements 15 installed on one side of the silicon substrate 310. The ejection elements 15 in the present embodiments are configured of electrothermal converting elements (heaters) that generate thermal energy as ejection energy for ejecting liquid. Electric power is supplied to each ejection element 15 via the electric wiring formed on the silicon substrate 310 with a film formation technique.

Further, the ejection port forming member 320 is formed on a surface of the silicon substrate 310 (the lower surface in FIG. 3B). In the ejection port forming member 320, the multiple pressure chambers 12, which correspond to the multiple ejection elements 15, and the multiple ejection ports 13 for ejecting ink are respectively formed by a photolithography technique. Furthermore, the common supply channels 18 and the common collection channels 19 are formed in the silicon substrate 310. Further, in the silicon substrate 310, the supply connection channels 323 which communicate the common supply channels 18 and the respective pressure chambers 12 and the collection connection channels 324 which communicate the common collection channels 19 and the respective pressure chambers 12 are formed. In the present embodiments, one ejection module 300 is configured to eject two types of ink. That is, of the two ejection modules illustrated in FIG. 3A, the ejection module 300 located on the left side in the drawing ejects black ink and cyan ink, and the ejection module 300 located on the right side in the drawing ejects magenta ink and yellow ink. Note that this combination is an example, and any combination of inks is possible. There may be a configuration in which one ejection module ejects one type of ink or a configuration in which one ejection module ejects three or more types of ink. The two ejection modules 300 do not have to eject the same number of types of ink. There may be a configuration equipped with one ejection module 300 or a configuration equipped with three or more ejection modules 300. Furthermore, in the example illustrated in FIG. 3A and FIG. 3B, two ejection port arrays extending in the Y direction are formed for one color of ink. The pressure chamber 12, the common supply channel 18, and the common collection channel 19 are formed for each of the multiple ejection ports 13 configuring the respective ejection port arrays.

The later-described ink supply ports and ink collection ports are formed on the back surface (upper surface in FIG. 3B) side of the silicon substrate 310. The ink supply ports supply ink to the multiple common supply channels 18 from the ink supply channels 48, and the ink collection ports collect ink from the multiple common collection channels 19 to the ink collection channels 49.

Note that the ink supply ports and ink collection ports referred to herein indicate apertures for supplying and collecting ink during ink circulation in the later-described forward direction. That is, during ink circulation in the forward direction, ink is supplied from the ink supply ports to the respective common supply channels 18, and ink is collected from the respective common collection channels 19 to the ink collection ports. However, there are cases where ink circulation of flowing ink in the opposite direction is performed. In this case, ink is supplied from the above-explained ink collection ports to the common collection channels 19, and ink is collected from the common supply channels 18 to the ink supply ports.

As illustrated in FIG. 3A, the back surfaces (upper surfaces in FIG. 3A) of the ejection modules 300 are adhesively fixed to one surface (lower surface in FIG. 3A) of the first support member 4. The ink supply channels 48 and the ink collection channels 49 are formed so as to penetrate from one surface to the other surface of the first support member 4. One aperture of the ink supply channels 48 communicates with the above-described ink supply ports in the silicon substrate 310, and one aperture of the ink collection channels 49 communicates with the above-described ink collection ports in the silicon substrate 310, respectively. Note that the ink supply channels 48 and the ink collection channels 49 are installed independently for the respective types of ink.

Further, the second support member 7 with the apertures 7*a* (see FIG. 2) through which the ejection modules 300 are inserted is adhesively fixed to one surface of the first support member 4 (lower surface in FIG. 3A). The second support member 7 holds the electric wiring member 5 electrically connected to the ejection modules 300. The electric wiring member 5 is a member for applying an electric signal for ejecting ink to the ejection modules 300. The electric connection portion between the ejection modules 300 and the electric wiring member 5 is sealed with a sealing material (not illustrated in the drawings) as protection from corrosion due to ink and external impact.

Further, the electric contact substrate 6 is bonded to the end portion 5*a* (see FIG. 2) of the electric wiring member 5 by thermocompression bonding using an anisotropic conductive film (not illustrated in the drawing), so that the electric wiring member 5 and the electric contact substrate 6 are electrically connected. The electric contact substrate 6 has an external signal input terminal (not illustrated in the drawings) for receiving electric signals from the liquid ejection apparatus 50.

Furthermore, the joint member 8 (see FIG. 3A) is installed between the first support member 4 and the circulation units 54. The supply ports 88 and the collection ports 89 are formed in the joint member 8 for the respective types of ink. The supply ports 88 and the collection ports 89 allow the ink supply channels 48 and the ink collection channels 49 of the first support member 4 to communicate with the channels formed in the circulation units 54. Note that, in FIG. 3A, the supply port 88B and collection port 89B correspond to black ink, and the supply port 88C and collection port 89C correspond to cyan ink. Further, the supply port 88M and the collection port 89M correspond to magenta ink, and the supply port 88Y and the collection port 89Y correspond to yellow ink.

Note that the apertures at one end portions of the ink supply channels 48 and the ink collection channels 49 in the first support member 4 respectively have small aperture areas corresponding to the ink supply ports and the ink collection ports of the silicon substrate 310. On the other hand, the apertures at the other end portions of the ink supply channels 48 and the ink collection channels 49 in the first support member 4 have shapes enlarged as wide as the large aperture areas of the joint member 8 which are formed in accordance with the channels of the circulation units 54. By adopting such a configuration, it is possible to suppress an increase in channel resistance to the ink collected from each collection channel. However, the respective shapes of the apertures at one end portions and the other end portions of the ink supply channels 48 and the ink collection channels 49 are not limited to the above-described example.

In the liquid ejection head 1 with the above-described configurations, the ink supplied to the circulation unit 54 passes through the supply ports 88 of the joint member 8 and the ink supply channels 48 of the first support member 4 and flows into the common supply channels 18 from the ink supply ports of the ejection modules 300. Subsequently, the ink flows from the common supply channels 18 into the pressure chambers 12 via the supply connection channels 323, and a part of the ink that has flowed into the pressure chambers is ejected from the ejection ports 13 by driving of the ejection elements 15. The remaining ink that has not been ejected flows from the pressure chambers 12 through the collection connection channels 324 and the common collection channels 19 into the ink collection channels 49 of the first support member 4 from the ink collection ports. Further, the ink that has flowed into the ink collection channels 49 flows through the collection ports 89 of the joint member 8 into the circulation units 54, so as to be collected.

<Constituent Elements of the Circulation Unit>

Figure 4:
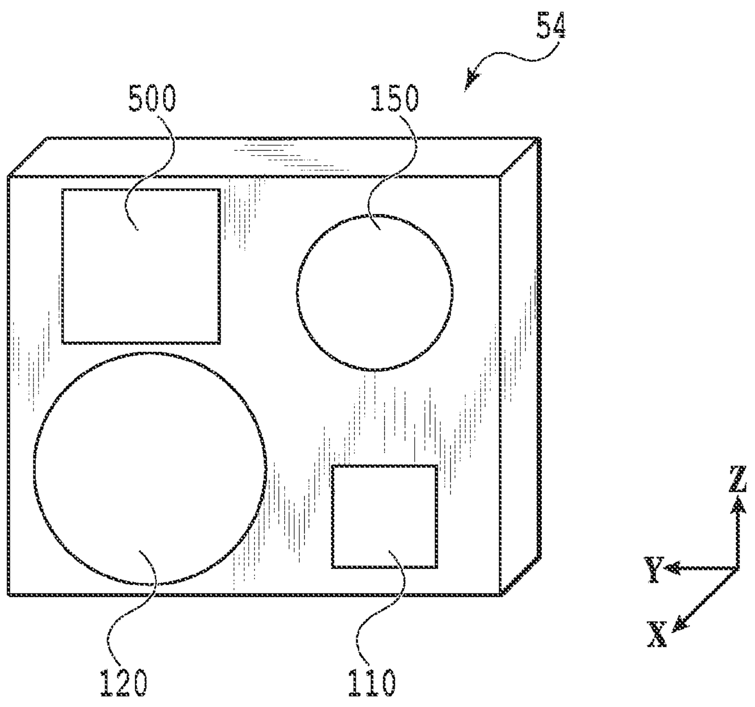
FIG. 4 is a schematic external view of a circulation unit.

FIG. 4 is a schematic external view of one circulation unit 54 corresponding to one type of ink applied to the printing apparatus of the present embodiments. The filter 110, the first pressure adjusting unit 120, the second pressure adjusting unit 150, and the circulation pump 500 are arranged in the circulation unit 54. These constituent elements are connected by the respective channels as illustrated in FIG. 5 and FIG. 6, so as to configure a circulation channel for supplying and collecting ink to and from the ejection modules 300 in the liquid ejection head 1.

<Circulation Channel in the Liquid Ejection Head>

Figure 5:
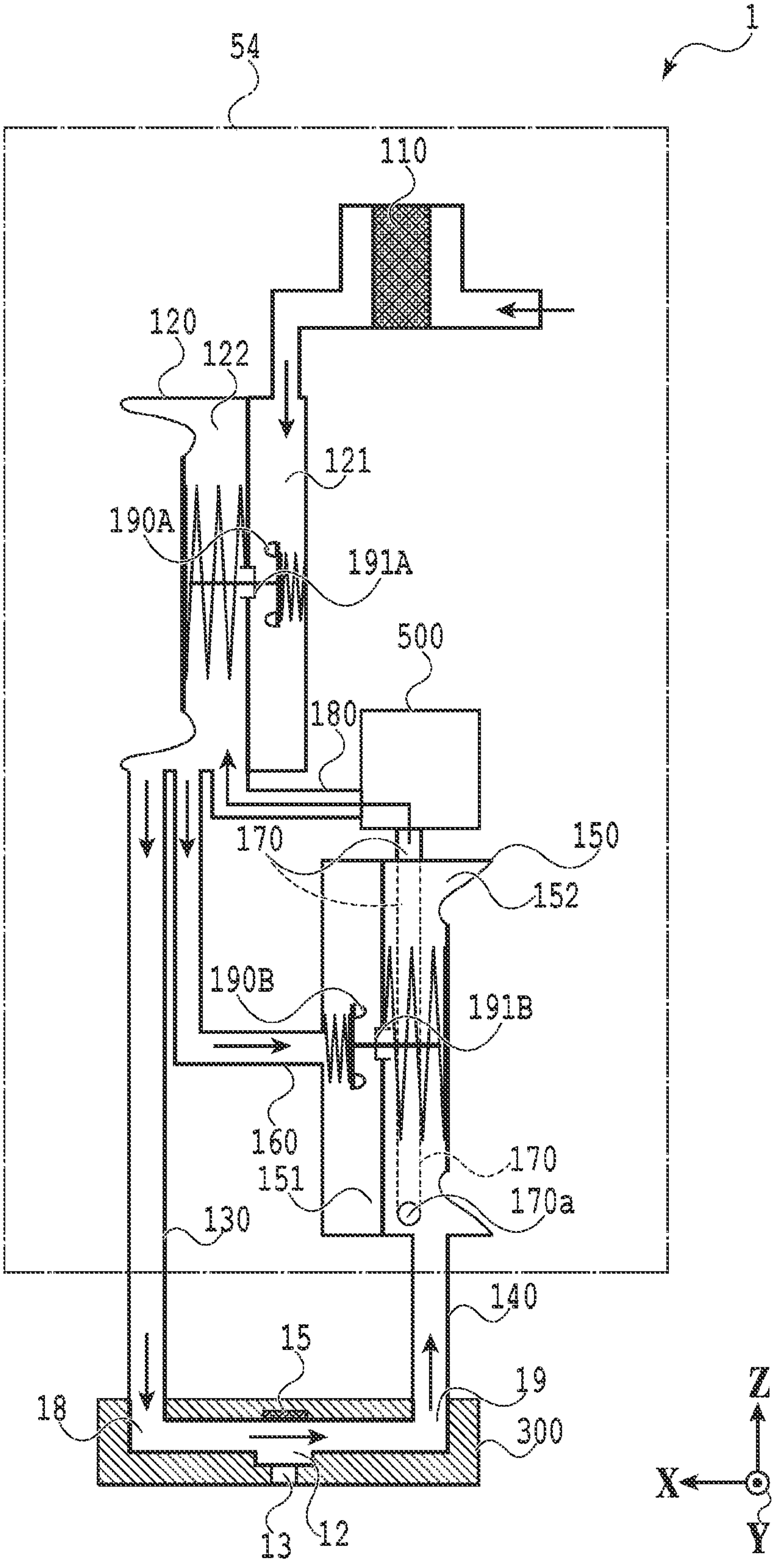
FIG. 5 is a vertical cross-sectional view illustrating a circulation channel.
Figure 6:
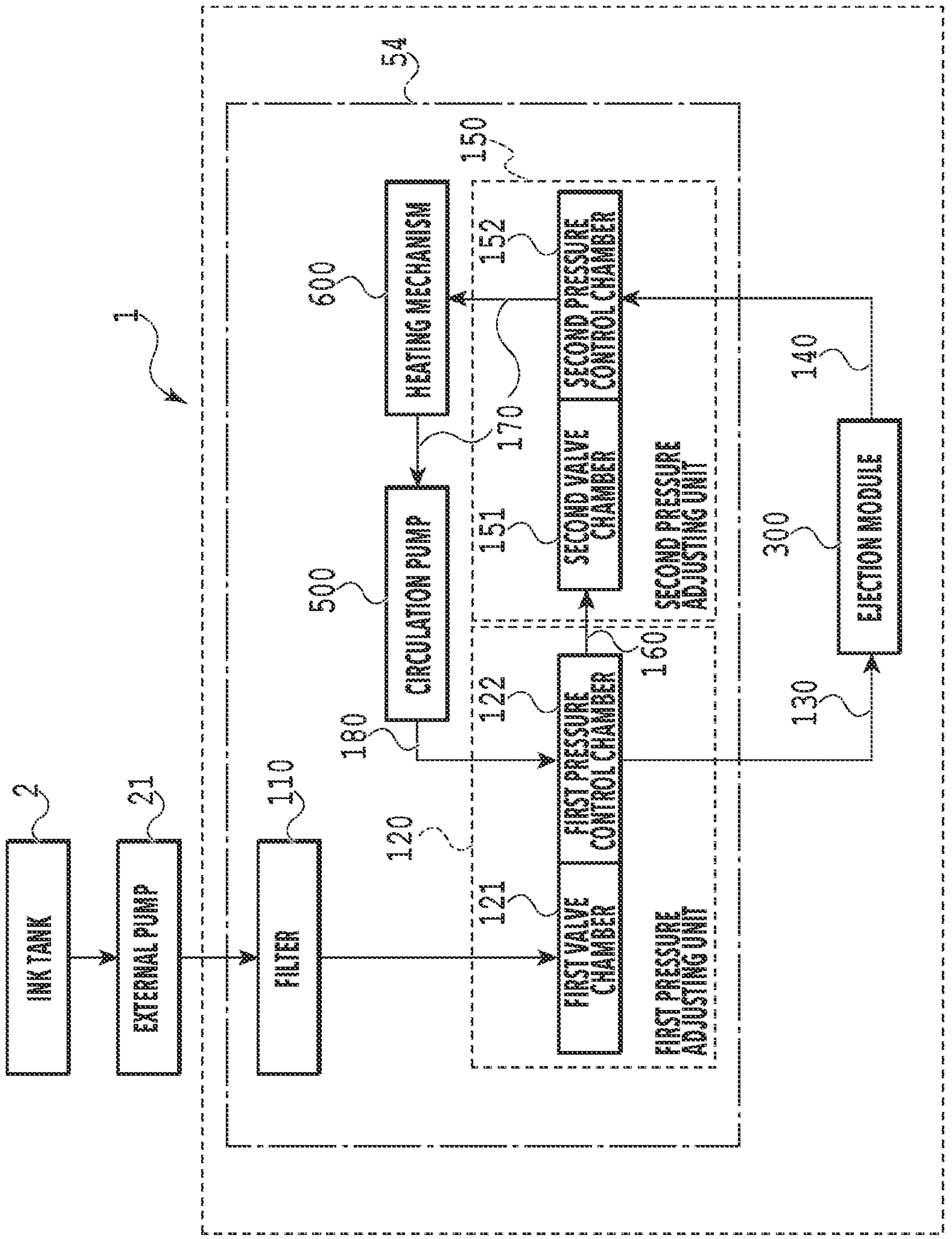
FIG. 6 is a block diagram schematically illustrating the circulation channel.

FIG. 5 is a vertical cross-sectional view schematically illustrating a circulation channel for one type of ink (one ink color) configured in the liquid ejection head 1. For more clearly explaining the circulation channel, the relative positions of the respective configurations in FIG. 5 (the first pressure adjusting unit 120, the second pressure adjusting unit 150, the circulation pump 500, etc.) are simplified. Therefore, the relative positions of the respective configurations are different from those of the later-described configurations of FIG. 19. Further, FIG. 6 is a block diagram schematically illustrating the circulation channel illustrated in FIG. 5. Note that, the detail of the heating mechanism 600 illustrated in FIG. 6 is explained in the description with reference to FIG. 20 below. As illustrated FIG. 5 and FIG. 6, the first pressure adjusting unit 120 includes the first valve chamber 121 and the first pressure control chamber 122. The second pressure adjusting unit 150 includes the second valve chamber 151 and the second pressure control chamber 152. The first pressure adjusting unit 120 is configured to have a relatively higher control pressure than that of the second pressure adjusting unit 150. In the present embodiments, by using these two pressure adjusting units 120 and 150, circulation within a constant pressure range is realized in the circulation channel. Further, the ink flows through the pressure chambers 12 (ejection elements 15) at a flow rate corresponding to the pressure difference between the first pressure adjusting unit 120 and the second pressure adjusting unit 150. Hereinafter, with reference to FIG. 5 and FIG. 6, the circulation channel in the liquid ejection head 1 and the ink flows in the circulation channel are explained. Note that the arrows in the respective drawings indicate the directions of ink flows.

First, an explanation is given of the connection state of each constituent element in the liquid ejection head 1. The external pump 21 that sends the ink contained in the ink tank 2 (see FIG. 6) installed outside the liquid ejection head 1 to the liquid ejection head 1 is connected to the circulation unit 54 via the ink supply tube 59 (see FIG. 1A and FIG. 1B). The filter 110 is installed in the ink channel located on the upstream side of the circulation unit 54. The ink supply path located on the downstream side of the filter 110 is connected to the first valve chamber 121 of the first pressure adjusting unit 120. The first valve chamber 121 communicates with the first pressure control chamber 122 via the communication port 191A that can be opened and closed by the valve 190A illustrated in FIG. 5.

The first pressure control chamber 122 is connected to the supply channel 130, the bypass channel 160, and the pump outlet channel 180 of the circulation pump 500. The supply channel 130 is connected to the common supply channel 18 via the aforementioned ink supply port installed in the ejection module 300. Further, the bypass channel 160 is connected to the second valve chamber 151 installed in the second pressure adjusting unit 150. The second valve chamber 151 communicates with the second pressure control chamber 152 via the communication port 191B that is opened and closed by the valve 190B illustrated in FIG. 5. Note that, in the example illustrated in FIG. 5 and FIG. 6, one end of the bypass channel 160 is connected to the first pressure control chamber 122 of the first pressure adjusting unit 120, and the other end of the bypass channel 160 is connected to the second valve chamber 151 of the second pressure adjusting unit 150. However, it is also possible that one end of the bypass channel 160 is connected to the supply channel 130 and the other end of the bypass channel is connected to the second valve chamber 151.

The second pressure control chamber 152 is connected to the collection channel 140. The collection channel 140 is connected to the common collection channel 19 via the aforementioned ink collection port installed in the ejection module 300. Furthermore, the second pressure control chamber 152 is connected to the circulation pump 500 via the pump inlet channel 170. Note that, in FIG. 5, 170*a* indicates the inlet port of the pump inlet channel 170.

Next, an explanation is given of the flow of ink in the liquid ejection head 1 with the above-described configuration. As illustrated in FIG. 6, the ink contained in the ink tank 2 is pressurized by the external pump 21 installed in the liquid ejection apparatus 50 and thus becomes an ink flow with a positive pressure, so as to be supplied to the circulation unit 54 of the liquid ejection head 1.

The ink supplied to the circulation unit 54 passes through the filter 110, so that foreign substances such as dust and air bubbles are removed, and then flows into the first valve chamber 121 installed in the first pressure adjusting unit 120. Although the pressure of the ink decreases due to the pressure loss while passing through the filter 110, the pressure of the ink at this stage is in a positive pressure state. Thereafter, the ink that has flowed into the first valve chamber 121 flows into the first pressure control chamber 122 through the communication port 191A if the valve 190A is in the opened state. Due to the pressure loss while passing through the communication port 191A, the ink that has flowed into the first pressure control chamber 122 is switched from a positive pressure to a negative pressure.

Next, an explanation is given of the ink flow in the circulation channel. The circulation pump 500 operates to send the ink suctioned from the pump inlet channel 170 on its upstream side to the pump outlet channel 180 on its downstream side. Therefore, by driving of the pump, the ink supplied to the first pressure control chamber 122 flows into the supply channel 130 and the bypass channel 160 together with the ink fed from the pump outlet channel 180. Note that, as described in detail later, a piezoelectric diaphragm pump whose driving source is a piezoelectric element attached to a diaphragm is used as the circulation pump capable of feeding liquid in the present embodiments. A piezoelectric diaphragm pump is a pump that changes the inner volume inside a pump chamber by inputting a driving voltage to a piezoelectric element so that two check valves are alternately moved due to pressure fluctuations, in order to feed liquid.

The ink that has flowed into the supply channel 130 flows from the ink supply port of the ejection module 300 to the pressure chamber 12 via the common supply channel 18, and a part of the ink is ejected from the ejection port 13 by driving (heat generation) of the ejection element 15. Further, the remaining ink that has not been used for the ejection flows from the pressure chamber 12, passes through the common collection channel 19, and then flows into the collection channel 140 which is connected to the ejection module 300. The ink that has flowed into the collection channel 140 flows into the second pressure control chamber 152 of the second pressure adjusting unit 150.

On the other hand, the ink that has flowed from the first pressure control chamber 122 into the bypass channel 160 flows into the second valve chamber 151 and then flows into the second pressure control chamber 152 through the communication port 191B. The ink that has flowed into the second pressure control chamber 152 through the bypass channel 160 and the ink that has been collected from the collection channel 140 are suctioned into the circulation pump 500 through the pump inlet channel 170 by driving of the circulation pump 500. Then, the ink suctioned into the circulation pump 500 is sent to the pump outlet channel 180 and flows into the first pressure control chamber 122 again. Subsequently, the ink that has flowed from the first pressure control chamber 122 into the second pressure control chamber 152 by passing through the ejection module 300 via the supply channel 130 and the ink that has flowed into the second pressure control chamber 152 via the bypass channel 160 flow into the circulation pump 500. Then, the ink is sent from the circulation pump 500 to the first pressure control chamber 122. In this way, the ink is circulated in the circulation channel.

As described above, in the present embodiment, the circulation pump 500 can circulate the liquid along the circulation channel formed in the liquid ejection head 1. Therefore, it is possible to suppress thickening of the ink in the ejection module 300 and deposition of precipitation components of the ink of the coloring materials, and the fluidity of the ink in the ejection module 300 and the ejection characteristics of the ejection ports can be maintained in preferable states.

Further, since the circulation channel in the present embodiments employs a configuration that is completed within the liquid ejection head 1, the length of the circulation channel can be significantly shortened, compared to the case in which ink is circulated between the ink tank 2 installed outside the liquid ejection head and the liquid ejection head 1. Therefore, it is possible to circulate ink with a small circulation pump.

Furthermore, as a connection channel between the liquid ejection head 1 and the ink tank 2, only a channel for supplying ink is installed. That is, a configuration not requiring a channel for collecting ink from the liquid ejection head 1 to the ink tank 2 is employed. Therefore, only a tube for supplying ink is necessary for connection of the ink tank 2 and the liquid ejection head 1, and a tube for collecting ink is not necessary. Therefore, the inside of the liquid ejection apparatus 50 can be configured simply with a reduced number of tubes, and thus it is possible to achieve downsizing of the entire apparatus. Furthermore, since the number of tubes is reduced, it is possible to reduce fluctuations of ink pressure caused by oscillation of the tubes associated with main-scanning of the liquid ejection head 1. Further, the oscillation of the tubes during main-scanning of the liquid ejection head 1 is considered as a driving load of the carriage motor that drives the carriage 60. Thus, the reduction in the number of tubes reduces the driving load on the carriage motor, which makes it possible to simplify the main-scanning mechanism including the carriage motor and the like. Furthermore, since it is not necessary to collect ink from the liquid ejection head to the ink tank, downsizing of the external pump 21 is also possible. In this way, according to the present embodiments, it is possible to achieve downsizing of the liquid ejection apparatus 50 and reduction in the cost.

<Pressure Adjusting Unit>

Figure 7C:
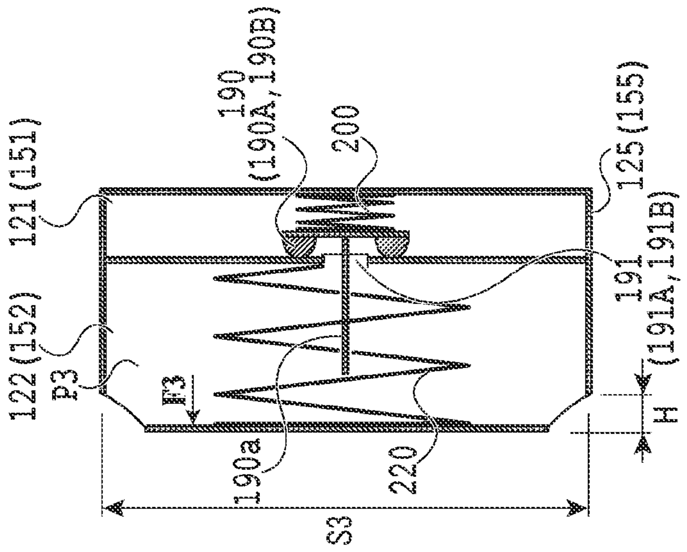
FIG. 7A to FIG. 7C are cross-sectional views illustrating an example of a pressure adjusting unit.
Figure 7B:
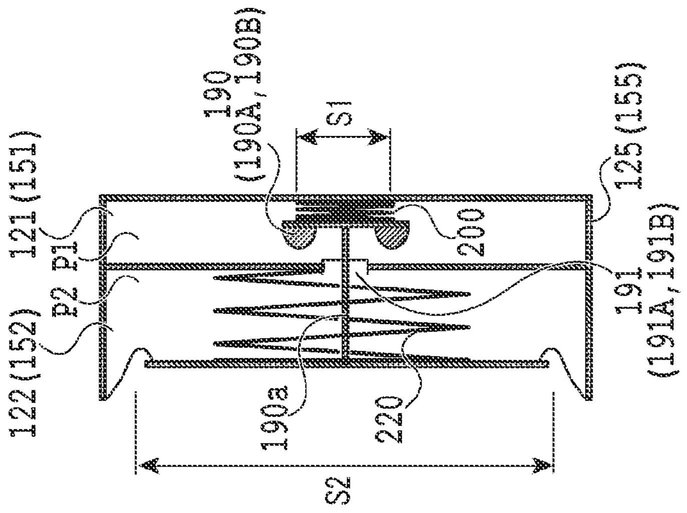
Figure 7A:
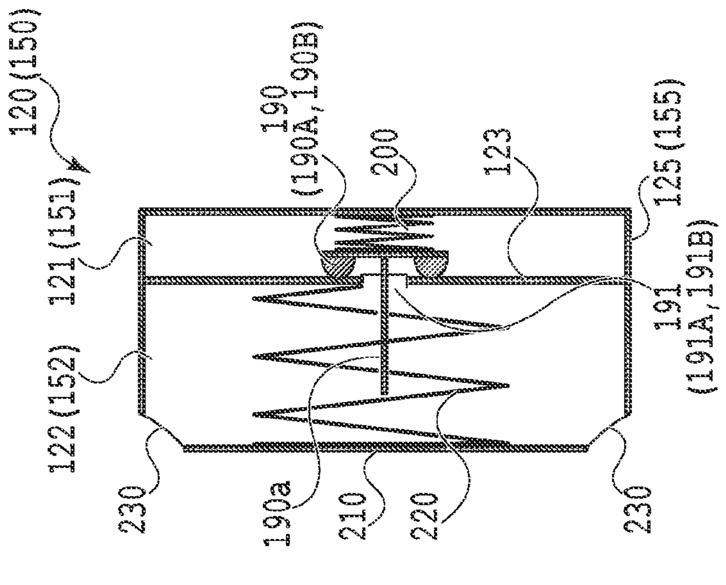

FIG. 7A to FIG. 7C are diagrams illustrating an example of the pressure adjusting units. With reference to FIG. 7A to FIG. 7C, an explanation is given of the configurations and functions of the pressure adjusting units (the first pressure adjusting unit 120, the second pressure adjusting unit 150) built in the above-described liquid ejection head 1. Note that the first pressure adjusting unit 120 and the second pressure adjusting unit 150 have substantially the same configuration. Therefore, the first pressure adjusting unit 120 is explained below as an example, and, for the second pressure adjusting unit 150, only the signs of the parts corresponding to the first pressure adjusting unit are written together in FIG. 7A to FIG. 7C. In the case of the second pressure adjusting unit 150, the first valve chamber 121 and the first pressure control chamber 122 explained below are to be replaced with the second valve chamber 151 and the second pressure control chamber 152.

The first pressure adjusting unit 120 includes the first valve chamber 121 and the first pressure control chamber 122 formed in the cylindrical case 125. The first valve chamber 121 and the first pressure control chamber 122 are separated by the partition 123 installed in the cylindrical case 125. However, the first valve chamber 121 communicates with the first pressure control chamber 122 via the communication port 191 formed in the partition 123. The first valve chamber 121 is equipped with the valve 190 that switches communication and disconnection between the first valve chamber 121 and the first pressure control chamber 122 at the communication port 191. The valve 190 is held at a position facing the communication port 191 by the valve spring 200 and has a configuration that can come into close contact with the partition 123 by the biasing force of the valve spring 200. The close contact of the valve 190 with the partition 123 blocks the flow of ink at the communication port 191. Note that, in order to increase the airtightness with the partition 123, it is preferable that the contact portion of the valve 190 with the partition 123 is formed of an elastic member. Further, the valve shaft 190*a* which is inserted through the communication port 191 is installed at the central part of the valve 190 in a projecting manner. By pressing this valve shaft 190*a* against the biasing force of the valve spring 200, the valve 190 is separated from the partition 123, so that ink can flow through the communication port 191. Hereinafter, the state in which the valve 190 blocks the flow of ink at the communication port 191 is referred to as a "closed state", and the state in which the flow of ink at the communication port 191 is allowed is referred to as an "opened state."

The aperture portion of the cylindrical case 125 is closed with the flexible member 230 and the pressing plate 210. The first pressure control chamber 122 is formed with the flexible member 230, the pressing plate 210, the peripheral wall of the case 125, and the partition 123. The pressing plate 210 is configured to be displaceable together with displacement of the flexible member 230. Although the materials of the pressing plate 210 and the flexible member 230 are not particularly limited, the pressing plate 210 can be configured of a resin molded part, and the flexible member 230 can be configured of a resin film, for example. In this case, the pressing plate 210 can be fixed to the flexible member 230 by thermal welding.

The pressure adjusting spring 220 (biasing member) is installed between the pressing plate 210 and the partition 123. Due to the biasing force of the pressure adjusting spring 220, the pressing plate 210 and the flexible member 230 are biased as illustrated in FIG. 7A in the direction that the inner volume of the first pressure control chamber 122 expands. Further, if the pressure in the first pressure control chamber 122 decreases, the pressing plate 210 and the flexible member 230 are displaced against the pressure of the pressure adjusting spring 220 in the direction that the inner volume of the first pressure control chamber 122 decreases. Further, if the inner volume of the first pressure control chamber 122 decreases to a certain amount, the pressing plate 210 abuts on the valve shaft 190*a* of the valve 190. Thereafter, if the inner volume of the first pressure control chamber 122 further decreases, the valve 190 moves together with the valve shaft 190*a* against the biasing force of the valve spring 200 to separate from the partition 123. Thus, the communication port 191 shifts to the opened state (the state of FIG. 7B).

In the present embodiments, the connections in the circulation channel are set so that the pressure in the first valve chamber 121 in a case where the communication port 191 shifts to the opened state is higher than the pressure in the first pressure control chamber 122. Thus, if the communication port 191 shifts to the opened state, ink flows from the first valve chamber 121 into the first pressure control chamber 122. Due to this inflow, the flexible member 230 and the pressing plate 210 are displaced in the direction that the inner volume of the first pressure control chamber 122 increases. As a result, the pressing plate 210 is separated from the valve shaft 190*a* of the valve 190, and the valve 190 is brought into close contact with the partition 123 due to the biasing force of the valve spring 200, so that the communication port 191 shifts to the closed state (the state of FIG. 7C).

In this way, as for the first pressure adjusting unit 120 according to the present embodiments, if the pressure inside the first pressure control chamber 122 decreases to a certain pressure or less (for example, if the negative pressure becomes stronger), ink flows from the first valve chamber 121 via the communication port 191. Thus, the pressure of the first pressure control chamber 122 does not decrease further. Therefore, the first pressure control chamber 122 is controlled to keep the pressure within a certain range.

Next, a detailed explanation is given of the pressure in the first pressure control chamber 122. It is assumed that the flexible member 230 and the pressing plate 210 are displaced according to the pressure of the first pressure control chamber 122 as described above, so that the pressing plate 210 abuts on the valve shaft 190*a* and the communication port 191 shifts to the opened state (the state of FIG. 7B). Here, the relationship among the forces acting on the pressing plate 210 is represented by Formula 1 below.

$$P2\times S2+F2+(P1-P2)\times S1+F1=0 \quad \text{Formula 1}$$

Furthermore, Formula 1 rearranged with respect to P2 is as follows.

$$P2=(F1+F2+P1\times S1)/(S2-S1) \quad \text{Formula 2}$$

P1: Pressure (gauge pressure) in the first valve chamber 121

P2: Pressure (gauge pressure) in the first pressure control chamber 122

F1: Spring force of the valve spring 200

F2: Spring force of the pressure adjusting spring 220

S1: Pressure-receiving area of the valve 190

S2: Pressure-receiving area of the pressing plate 210

Here, as for the spring force F1 of the valve spring 200 and the spring force F2 of the pressure adjusting spring 220, it is assumed that the direction of pushing the valve 190 and the pressing plate 210 is positive (the direction to the left in FIG. 7A to FIG. 7C). Further, regarding the pressure P1 in the first valve chamber 121 and the pressure P2 in the first pressure control chamber 122, P1 is configured to satisfy the relationship of P1≥P2.

The pressure P2 in the first pressure control chamber 122 in the case where the communication port 191 shifts to the opened state is determined by Formula 2, and, in the case where the communication port 191 shifts to the opened state, ink flows from the first valve chamber 121 to the first pressure control chamber 122 due to the configuration with the relationship of P1≥P2. As a result, the pressure P2 in the first pressure control chamber 122 does not decrease any more, and P2 is kept to a pressure within a certain range.

On the other hand, as illustrated in FIG. 7C, the relationship among the forces acting on the pressing plate 210 in the case where the pressing plate 210 shifts to the state of not abutting on the valve shaft 190*a* so that the communication port 191 shifts to the closed state is as shown in Formula 3.

$$P3\times S3+F3=0 \quad \text{Formula 3}$$

Here, Formula 3 rearranged with respect to P3 is as follows.

$$P3=-F3/S3 \quad \text{Formula 4}$$

F3: Spring force of the pressure adjusting spring 220 in a case where the pressing plate 210 and the valve shaft 190*a* do not abut on each other P3: Pressure (gauge pressure) in the first pressure control chamber 122 in a case where the pressing plate 210 and the valve shaft 190*a* do not abut on each other S3: Pressure-receiving area of the pressing plate 210 in a case where the pressing plate 210 and the valve 190 do not abut on each other Here, in FIG. 7C, the state in which the pressing plate 210 and the flexible member 230 have been displaced to their displaceable limits in the left direction of the drawing is illustrated. The pressure P3 in the first pressure control chamber 122, the spring force F3 of the pressure adjusting spring 220, and the pressure-receiving area S3 of the pressing plate 210 change according to the displacement amounts of the pressing plate 210 and the flexible member 230 being displaced to the state of FIG. 7C. Specifically, if the pressing plate 210 and the flexible member 230 are located further to the right of FIG. 7A to FIG. 7C than in FIG. 7C, the pressure-receiving area S3 of the pressing plate 210 becomes smaller, and the spring force F3 of the pressure adjusting spring 220 becomes larger. As a result, the pressure P3 in the first pressure control chamber 122 decreases according to the relationship of Formula 4. Therefore, according to Formula 2 and Formula 4, while shifting from the state of FIG. 7B to the state of FIG. 7C, the pressure in the first pressure control chamber 122 gradually increases (that is, the negative pressure becomes weaker and approaches the positive pressure side). That is, the pressing plate 210 and the flexible member 230 are gradually displaced leftward from the state where the communication port 191 is in the opened state, and the pressure in the first pressure control chamber gradually increases while the inner volume of the first pressure control chamber 122 finally reaches the displaceable limit. That is, the negative pressure becomes weaker.

<Circulation Pump>

Figure 8B:
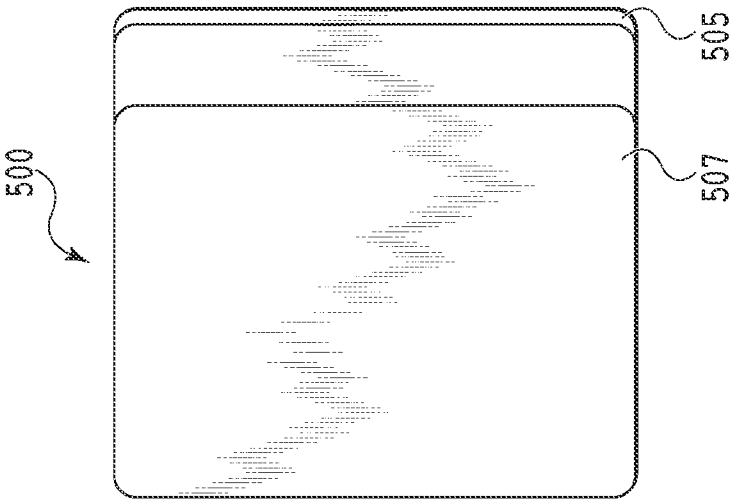
FIG. 8A and FIG. 8B are external perspective views of a circulation pump.
Figure 8A:
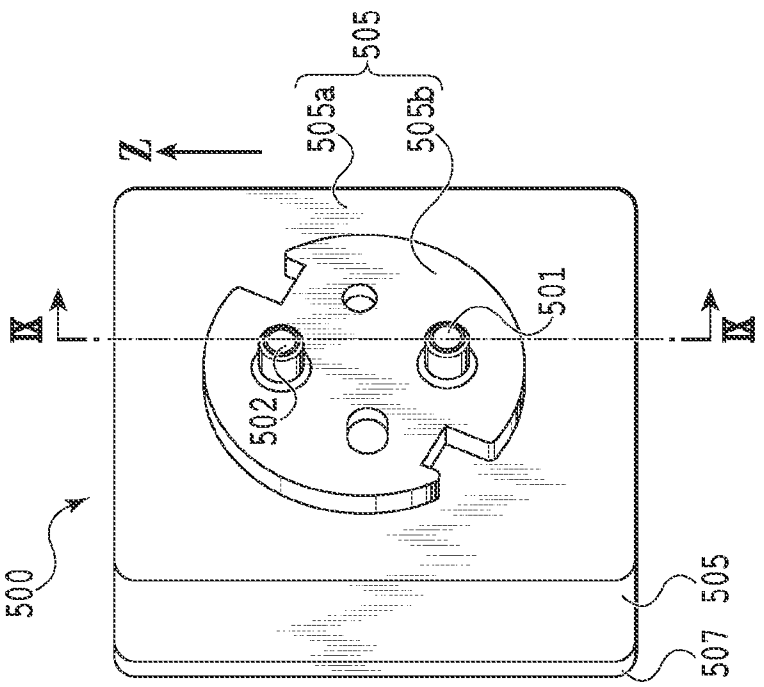
Figure 9:
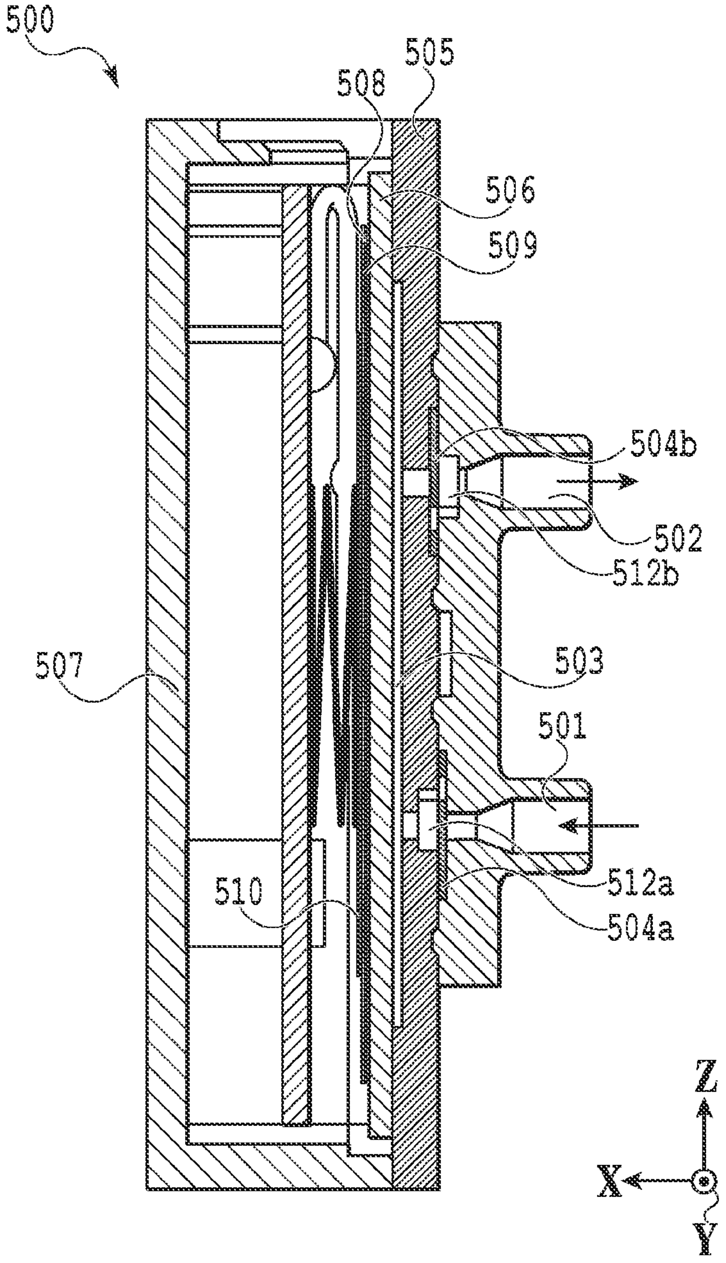
FIG. 9 is a cross-sectional view taken along line IX-IX of the circulation pump illustrated in FIG. 8A.

Next, with reference to FIG. 8A to FIG. 9, a detailed explanation is given of the configuration and function of the circulation pump 500 built in the liquid ejection head 1.

FIG. 8A and FIG. 8B are external perspective views of the circulation pump 500. FIG. 8A is an external perspective view illustrating the front side of the circulation pump 500, and FIG. 8B is an external perspective view illustrating the back side of the circulation pump 500. The outer shell of the circulation pump 500 is configured with the pump case 505 and the cover 507 fixed to the pump case 505. The pump case 505 is configured with the case main body 505*a* and the channel connection member 505*b* which is adhesively fixed to the outer surface of the case main body 505*a*. The case main body 505*a* and the channel connection member 505*b* are respectively equipped with pairs of through holes that are installed at two different positions and communicate with each other. A pair of through holes installed at one position forms the pump supply hole 501, and a pair of through holes installed at the other position forms the pump discharge hole 502. The pump supply hole 501 is connected to the pump inlet channel 170 which is connected to the second pressure control chamber 152, and the pump discharge hole 502 is connected to the pump outlet channel 180 which is connected to the first pressure control chamber 122. Ink supplied from the pump supply hole 501 passes through the later-described pump chamber 503 (see FIG. 9) to be discharged from the pump discharge hole 502.

FIG. 9 is a cross-sectional view taken along line IX-IX of the circulation pump 500 illustrated in FIG. 8A. The diaphragm 506 is adjoined to the inner surface of the pump case 505, so that the pump chamber 503 is formed between this diaphragm 506 and a recess formed in the inner surface of the pump case 505. The pump chamber 503 communicates with the pump supply hole 501 and the pump discharge hole 502 formed in the pump case 505. Further, the check valve 504*a* is installed in the middle portion of the pump supply hole 501, and the check valve 504*b* is installed in the middle portion of the pump discharge hole 502. Specifically, the check valve 504*a* is arranged so that a part thereof can move leftward in the drawing in the space 512*a* formed in the middle portion of the pump supply hole 501. Further, the check valve 504*b* is arranged so that a part thereof can move rightward in the drawing in the space 512*b* formed in the middle portion of the pump discharge hole 502.

If the pump chamber 503 is depressurized due to an increase in the inner volume of the pump chamber 503 caused by displacement of the diaphragm 506, the check valve 504*a* is separated (that is, moves leftward in the drawing) from the aperture of the pump supply hole 501 inside the space 512*a*. Since the check valve 504*a* is separated from the aperture of the pump supply hole 501 inside the space 512*a*, the pump supply hole 501 shifts to the opened state in which ink is allowed to flow. Further, if the pump chamber 503 is pressurized due to a decrease in the inner volume of the pump chamber 503 caused by displacement of the diaphragm 506, the check valve 504*a* is brought into close contact with the wall surrounding the aperture of the pump supply hole 501, which results in a shift to the closed state in which ink flow at the pump supply hole 501 is blocked.

On the other hand, if the pump chamber 503 is depressurized, the check valve 504*b* comes into close contact with the wall surrounding the aperture of the pump case 505 and shifts to the closed state in which the flow of ink at the pump discharge hole 502 is blocked. Further, if the pump chamber 503 is pressurized, the check valve 504*b* is separated from the aperture of the pump case 505 and moves toward the space 512*b* (that is, moves rightward in the drawing), so that the flow of ink at the pump discharge hole 502 is allowed.

Note that each of the check valves 504*a* and 504*b* may be made of any material that can be deformed according to the pressure inside the pump chamber 503, and, for example, the check valves 504*a* and 504*b* may be formed of an elastic member, such as EPDM or elastomer, or a film or thin plate made of polypropylene or the like. However, there is not a limitation as such.

As described above, the pump chamber 503 is formed by adjoining the pump case 505 and the diaphragm 506. Therefore, the pressure in the pump chamber 503 changes as the diaphragm 506 deforms. For example, if the diaphragm 506 is displaced toward the pump case 505 (displaced rightward in the drawing) so that the inner volume of the pump chamber 503 is reduced, the pressure inside the pump chamber 503 increases. Thus, the check valve 504*b* which is arranged so as to face the pump discharge hole 502 shifts to the opened state, so that the ink in the pump chamber 503 is discharged. Here, the check valve 504*a* which is arranged so as to face the pump supply hole 501 comes into close contact with the wall surrounding the pump supply hole 501, and thus backflow of ink from the pump chamber 503 to the pump supply hole 501 is suppressed.

Further, contrarily, in a case where the diaphragm 506 is displaced in the direction that the pump chamber 503 expands, the pressure in the pump chamber 503 decreases. Thus, the check valve 504*a* which is arranged so as to face the pump supply hole 501 shifts to the opened state, so that ink is supplied to the pump chamber 503. Here, the check valve 504*b* which is arranged in the pump discharge hole 502 comes into close contact with the wall surrounding the aperture formed in the pump case 505 to block the aperture. Therefore, backflow of ink from the pump discharge hole 502 to the pump chamber 503 is suppressed.

In this way, in the circulation pump 500, ink is suctioned and discharged by deformation of the diaphragm 506, which changes the pressure inside the pump chamber 503. Here, if bubbles enter the pump chamber 503, even if the diaphragm 506 is displaced, the expansion and contraction of the bubbles reduce the pressure change inside the pump chamber 503, which decreases the amount of liquid to be fed. Therefore, the pump chamber 503 is arranged to be parallel to the gravity so that bubbles which have entered the pump chamber 503 can be easily collected to the upper part of the pump chamber 503, and the pump discharge hole 502 is arranged above the center of the pump chamber 503. Thus, it is possible to improve the performance of discharging bubbles inside the pump, so that the flow rate can be stabilized.

<Flow of Ink in the Liquid Ejection Head>

Figures 10A, 10B, 10C, 10D, 10E:
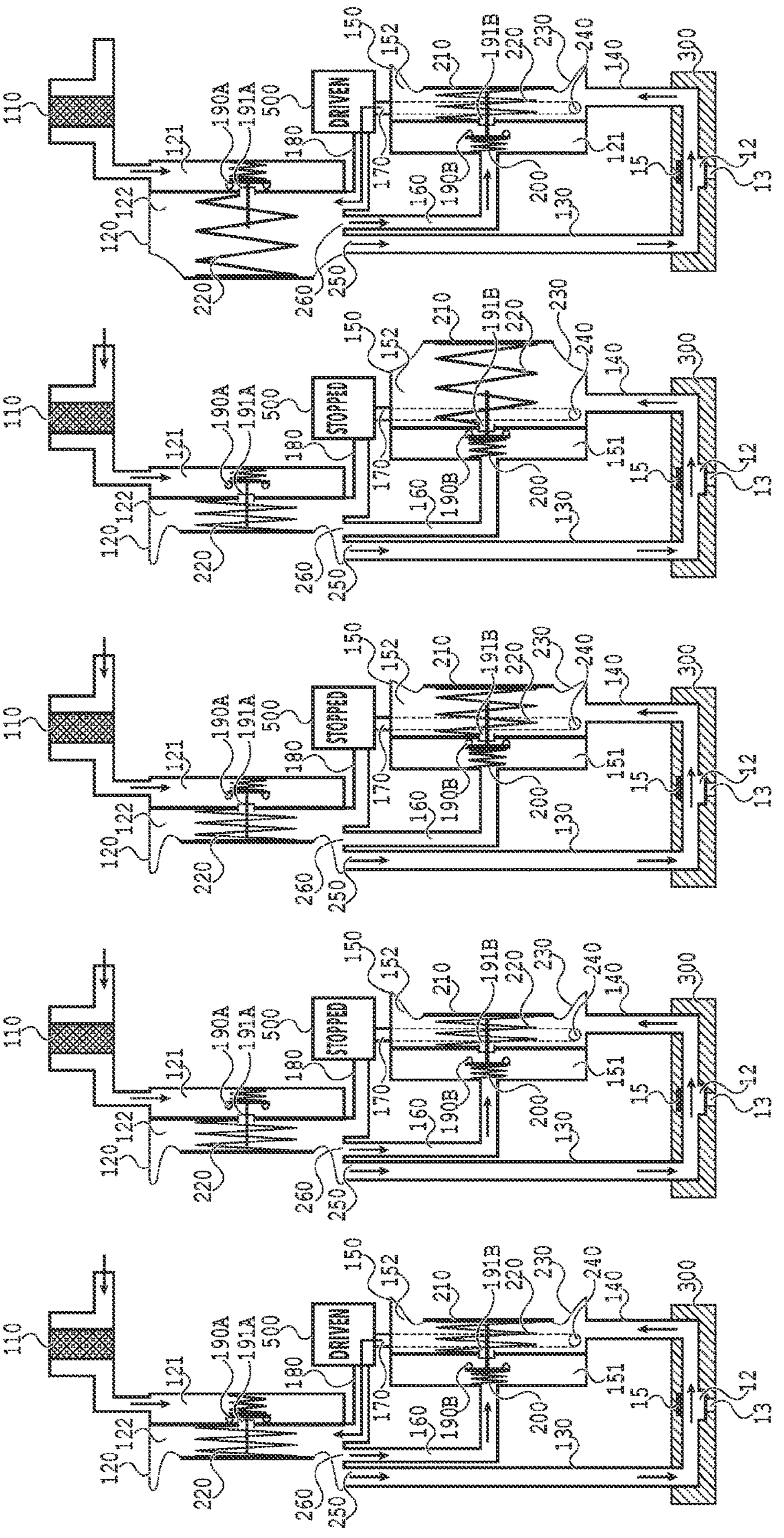
FIG. 10A to FIG. 10E are diagrams for explaining the flow of ink in the liquid ejection head.

FIG. 10A to FIG. 10E are diagrams for explaining the flow of ink in the liquid ejection head. The circulation of ink inside the liquid ejection head 1 is explained with reference to FIG. 10A to FIG. 10E. For more clearly explaining the circulation channel of ink, the relative positions of the respective configurations in FIG. 10A to FIG. 10E (the first pressure adjusting unit 120, the second pressure adjusting unit 150, the circulation pump 500, etc.) are simplified. Therefore, the relative positions of the respective configurations are different from those of the later-described configurations of FIG. 19. FIG. 10A is a diagram schematically illustrating the flow of ink during a printing operation in which ink is ejected from the ejection ports 13 to perform printing. Note that the arrows in the drawings indicate the flows of ink. In the present embodiments, driving of both of the external pump 21 and the circulation pump 500 is started to perform a printing operation. Note that the external pump 21 and the circulation pump 500 may be driven regardless of the printing operation. Further, the external pump 21 and the circulation pump 500 may not be driven in conjunction with each other and may be driven independently.

During the printing operation, the circulation pump 500 is in the ON state (driving state), so that the ink flowing out from the first pressure control chamber 122 flows into the supply channel 130 and the bypass channel 160. The ink that has flowed into the supply channel 130 passes through the ejection module 300 and then flows into the collection channel 140, so as to be supplied to the second pressure control chamber 152 thereafter.

On the other hand, the ink that has flowed from the first pressure control chamber 122 into the bypass channel 160 flows into the second pressure control chamber 152 through the second valve chamber 151. The ink that has flowed into the second pressure control chamber 152 passes through the pump inlet channel 170, the circulation pump 500, and the pump outlet channel 180, and then flows into the first pressure control chamber 122 again. Here, the control pressure by the first valve chamber 121 is set to be higher than the control pressure of the first pressure control chamber 122, based on the above-described relationship of Formula 2. Therefore, the ink inside the first pressure control chamber 122 is supplied to the ejection module 300 again via the supply channel 130 without flowing into the first valve chamber 121. The ink that has flowed into the ejection module 300 passes through the collection channel 140, the second pressure control chamber 152, the pump inlet channel 170, the circulation pump 500, and the pump outlet channel 180, and flows into the first pressure control chamber 122 again. The ink circulation completed within the liquid ejection head 1 is performed as described above.

In the ink circulation described above, the circulation amount (flow rate) of ink in the ejection module 300 is determined by the pressure difference between the control pressures of the first pressure control chamber 122 and the second pressure control chamber 152. Further, this pressure difference is set so as to obtain a circulation amount that can suppress thickening of the ink in the vicinity of the ejection ports in the ejection module 300. Further, the amount of ink consumed by printing is supplied from the ink tank 2 to the first pressure control chamber 122 via the filter 110 and the first valve chamber 121. A detailed explanation is given of the mechanism for supplying the consumed amount of ink. Since the amount of ink in the circulation channel is reduced by the amount of ink consumed by printing, the pressure in the first pressure control chamber is reduced, and, as a result, the amount of ink in the first pressure control chamber 122 is reduced as well. As the amount of ink in the first pressure control chamber 122 decreases, the inner volume of the first pressure control chamber 122 decreases. Due to this decrease in the inner volume of the first pressure control chamber 122, the communication port 191A shifts to the opened state, so that ink is supplied from the first valve chamber 121 to the first pressure control chamber 122. The supplied ink experiences a pressure loss while passing through the communication port 191A from the first valve chamber 121 and flows into the first pressure control chamber 122, and thus the ink with the positive pressure is switched to a state with a negative pressure. Then, since the ink flows into the first pressure control chamber 122 from the first valve chamber 121, the pressure in the first pressure control chamber thereby increases, and thus the inner volume of the first pressure control chamber increases, so that the communication port 191A shifts to the closed state. In this way, the communication port 191A alternates between the opened state and the closed state as the ink is consumed. Further, in a case where the ink is not consumed, the communication port 191A is maintained in the closed state.

FIG. 10B schematically illustrates the flow of ink immediately after a printing operation is terminated and the circulation pump 500 shifts to the OFF state (the stopped state). At the point in time where a printing operation is terminated and the circulation pump 500 is turned off, the pressure in the first pressure control chamber 122 and the pressure in the second pressure control chamber 152 are both the pressures controlled during the printing operation. Therefore, according to the pressure difference between the pressure in the first pressure control chamber 122 and the pressure in the second pressure control chamber 152, movement of ink occurs as illustrated in FIG. 10B. Specifically, the ink flow of being supplied from the first pressure control chamber 122 to the ejection module 300 via the supply channel 130 and then reaching the second pressure control chamber 152 via the collection channel 140 continues occurring. Further, the ink flow of reaching the second pressure control chamber 152 via the bypass channel 160 and the second valve chamber 151 from the first pressure control chamber 122 continues occurring as well.

The amount of ink moved from the first pressure control chamber 122 to the second pressure control chamber 152 by these ink flows is supplied from the ink tank 2 to the first pressure control chamber 122 via the filter 110 and the first valve chamber 121. Therefore, the interior contents of the first pressure control chamber 122 are kept constant. Based on the above-described relationship of Formula 2, if the interior contents of the first pressure control chamber 122 are constant, the spring force F1 of the valve spring 200, the spring force F2 of the pressure adjusting spring 220, the pressure-receiving area S1 of the valve 190, and the pressure-receiving area S2 of the pressing plate 210 are kept constant. Therefore, the pressure in the first pressure control chamber 122 is determined according to the change in the pressure (gauge pressure) P1 in the first valve chamber 121. Therefore, in a case where the pressure P1 in the first valve chamber 121 does not change, the pressure P2 in the first pressure control chamber 122 is kept at the same pressure as the pressure controlled during the printing operation.

On the other hand, the pressure in the second pressure control chamber 152 changes with time according to the change in the interior contents caused by the inflow of ink from the first pressure control chamber 122. Specifically, as illustrated in FIG. 10C, the pressure in the second pressure control chamber 152 changes from the state of FIG. 10B according to Formula 2 until the communication port 191B shifts to the closed state and then the second valve chamber 151 and the second pressure control chamber 152 shift to the non-communicating state. Thereafter, the pressing plate 210 and the valve shaft 190*a* are brought into the non-abutting state, and the communication port 191B shifts to the closed state. Further, as illustrated in FIG. 10D, ink flows from the collection channel 140 into the second pressure control chamber 152. This inflow of ink displaces the pressing plate 210 and the flexible member 230, and the pressure in the second pressure control chamber 152 changes according to Formula 4 until the inner volume of the second pressure control chamber 152 reaches its maximum. That is, the pressure increases.

Note that, in the state of FIG. 10C, the ink flow of reaching the second pressure control chamber 152 via the bypass channel 160 and the second valve chamber 151 from the first pressure control chamber 122 does not occur. Therefore, there is only the flow in which the ink in the first pressure control chamber 122 is supplied to the ejection module 300 via the supply channel 130 and then reaches the second pressure control chamber 152 via the collection channel 140. As described above, the movement of ink from the first pressure control chamber 122 to the second pressure control chamber 152 depends on the pressure difference between the pressure in the first pressure control chamber 122 and the pressure in the second pressure control chamber 152. Therefore, if the pressure in the second pressure control chamber 152 becomes equal to the pressure in the first pressure control chamber 122, the ink stops moving.

Further, in a state where the pressure in the second pressure control chamber 152 becomes equal to the pressure in the first pressure control chamber 122, the second pressure control chamber 152 expands to the state illustrated in FIG. 10D. If the second pressure control chamber 152 expands as illustrated in FIG. 10D, a reservoir portion capable of storing ink is formed in the second pressure control chamber 152. Note that the transition from the stopping of the circulation pump 500 to the state of FIG. 10D is performed in a time period of about 1 to 2 minutes, although the time period may vary depending on the shapes and sizes of the channels and the properties of the ink. If the circulation pump 500 is driven from the state illustrated in FIG. 10D in which ink is stored in the reservoir portion, the ink in the reservoir portion is supplied to the first pressure control chamber 122 by the circulation pump 500. Thus, the amount of ink in the first pressure control chamber 122 increases as illustrated in FIG. 10E, and the flexible member 230 and pressing plate 210 are displaced in the expanding direction. Then, if the circulation pump 500 continues to be driven, the state in the circulation channel changes as illustrated in FIG. 10A.

Note that, although FIG. 10A is explained as an example during the printing operation in the above-described explanation, it is also possible that the ink is circulated without performing the printing operation as described above. Even in this case, such a flow of ink as illustrated in FIG. 10A to 10E occurs according to driving and stopping of the circulation pump 500.

Further, as described above, according to the example in the present embodiments, although the communication port 191B in the second pressure adjusting unit 150 shifts to the opened state in a case where the circulation pump 500 is driven to circulate ink and shifts to the closed state in a case where the circulation of ink stops, there is not a limitation as such. The control pressure may be set so that the communication port 191B in the second pressure adjusting unit 150 is in the closed state even in a case where the circulation pump 500 is driven to circulate the ink. Hereinafter, a specific explanation is given together with the role of the bypass channel 160.

The bypass channel 160 connecting the first pressure adjusting unit 120 and the second pressure adjusting unit 150 is installed so that, for example, in a case where a negative pressure generated in the circulation channel becomes stronger than a predetermined value, the ejection module 300 is not affected by that. Further, the bypass channel 160 is installed also to supply ink to the pressure chamber 12 from both sides of the supply channel 130 and the collection channel 140.

First, an explanation is given of the example in which, in a case where the negative pressure becomes stronger than a predetermined value, the ejection module 300 is not affected by that since the bypass channel 160 is installed. For example, changes in environmental temperature may change the properties (e.g., viscosity) of ink. If the viscosity of ink changes, the pressure loss in the circulation channel also changes. For example, if the viscosity of ink is lowered, the pressure loss in the circulation channel is reduced. As a result, the flow rate of the circulation pump 500 driven at a constant driving amount increases, so that the flow rate in the ejection module 300 increases. On the other hand, since the ejection module 300 is kept at a constant temperature by a temperature adjustment mechanism (not illustrated in the drawings), the viscosity of the ink in the ejection module 300 is kept constant even if the environmental temperature changes. Although the viscosity of the ink in the ejection module 300 does not change, the flow rate of the ink flowing in the ejection module 300 increases, and thus the negative pressure in the ejection module 300 is increased by the flow resistance. If the negative pressure in the ejection module 300 becomes stronger than the predetermined value in this way, the meniscus of the ejection port 13 is broken, so that outside air is drawn into the circulation channel, and thus normal ejection may not be performed. Further, even if the meniscus is not broken, the negative pressure in the pressure chamber 12 may become stronger than the predetermined pressure, which may affect ejection.

Therefore, in the present embodiments, the bypass channel 160 is formed in the circulation channel. By installing the bypass channel 160, ink also flows through the bypass channel 160 in a case where the negative pressure becomes stronger than the predetermined value, and thus the pressure in the ejection module 300 can be kept constant. Therefore, for example, it is also possible that the communication port 191B in the second pressure adjusting unit 150 is configured to have such a control pressure that maintains the closed state even in a case where the circulation pump 500 is being driven. Further, it is also possible to set the control pressure in the second pressure adjusting unit so that the communication port 191B in the second pressure adjusting unit 150 shifts to the opened state in a case where the negative pressure becomes stronger than the predetermined value. That is, even in a case where the flow rate of the pump changes due to a change in viscosity caused by a change in the environment or the like, if the meniscus is not broken or as long as a predetermined negative pressure is maintained, it is also possible that the communication port 191B is in the closed state in a case where the circulation pump 500 is being driven.

Next, an explanation is given of the example in which the bypass channel 160 is installed to supply ink to the pressure chamber 12 from both sides of the supply channel 130 and the collection channel 140. Pressure fluctuations in the circulation channel can also be caused by an ejection operation of the ejection element 15. This is because a force that draws ink into the pressure chamber is generated with the ejection operation.

Hereinafter, an explanation is given of an aspect that the ink supplied to the pressure chamber 12 is supplied from both of the supply channel 130 side and the collection channel 140 side in a case where high-duty printing is continued. Note that, although the definition of duty may change depending on various conditions, here, the state in which one 4 pl ink droplet is printed on a 1200 dpi grid is considered as 100%. High-duty printing is assumed to be printing with a duty of 100%, for example.

If high-duty printing is continued, the amount of ink flowing into the second pressure control chamber 152 from the pressure chamber 12 through the collection channel 140 decreases. On the other hand, since the circulation pump 500 makes a constant amount of ink flow out, the balance between the inflow and outflow in the second pressure control chamber 152 is lost, and, as a result, the amount of ink in the second pressure control chamber 152 decreases, the negative pressure in the pressure control chamber 152 becomes stronger, and the second pressure control chamber 152 contracts. Further, as the negative pressure in the second pressure control chamber 152 becomes stronger, the inflow amount of ink flowing into the second pressure control chamber 152 via the bypass channel 160 increases, so that the second pressure control chamber 152 is stabilized in a state where the outflow and the inflow are balanced. Thus, as a result, the negative pressure in the second pressure control chamber 152 becomes stronger according to the duty. Further, as described above, in the configuration in which the communication port 191B is in the closed state if the circulation pump 500 is being driven, the communication port 191B shifts to the opened state according to the duty so that ink flows into the second pressure control chamber 152 from the bypass channel 160.

Further, if the printing with a higher duty is continued, the amount that flows from the pressure chamber 12 into the second pressure control chamber 152 through the collection channel 140 decreases, and, instead, the amount that flows from the communication port 191B into the second pressure control chamber 152 through the bypass channel 160 increases. If this state progresses further, the amount of ink flowing into the second pressure control chamber 152 from the pressure chamber 12 through the collection channel 140 becomes zero, so that all the ink flowing out to the circulation pump 500 is the ink flowing in from the communication port 191B. If this state progresses further, then the ink backs up from the second pressure control chamber 152 to the pressure chamber 12 through the collection channel 140. In this state, the ink flowing out from the second pressure control chamber 152 to the circulation pump 500 and the ink flowing out to the pressure chamber 12 flow into the second pressure control chamber 152 from the communication port 191B through the bypass channel 160. In this case, ejection is performed by filling the pressure chamber 12 with the ink in the supply channel 130 and the ink in the collection channel 140.

Note that the backflow of ink that occurs in a case where this print duty is high is a phenomenon that occurs due to the installation of the bypass channel 160. Further, although the example in which the communication port 191B in the second pressure adjusting unit shifts to the opened state in response to the backflow of ink is explained in the above description, the backflow of ink may occur in a state where the communication port 191B in the second pressure adjusting unit is in the opened state. Further, even in a configuration in which the second pressure adjusting unit is not installed, the above-described backflow of ink can occur since the bypass channel 160 is installed.

<Configuration of the Ejection Unit>

Figure 11A:
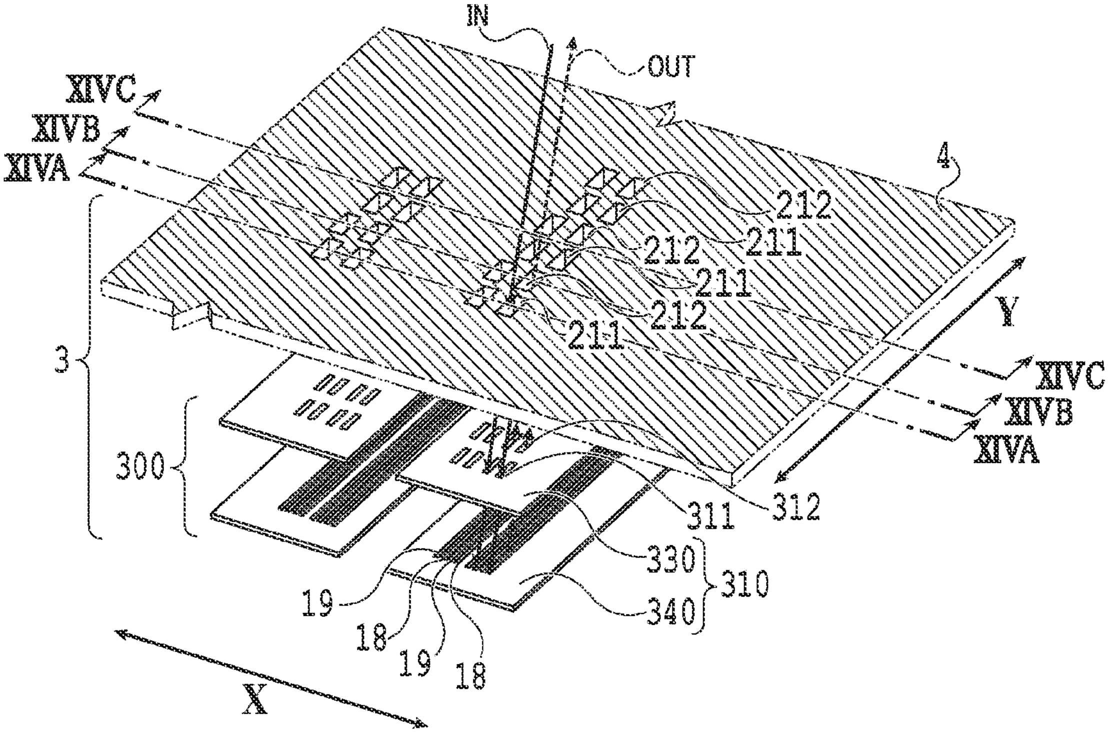
FIG. 11A and FIG. 11B are schematic diagrams illustrating circulation channels in an ejection unit.
Figure 11B:
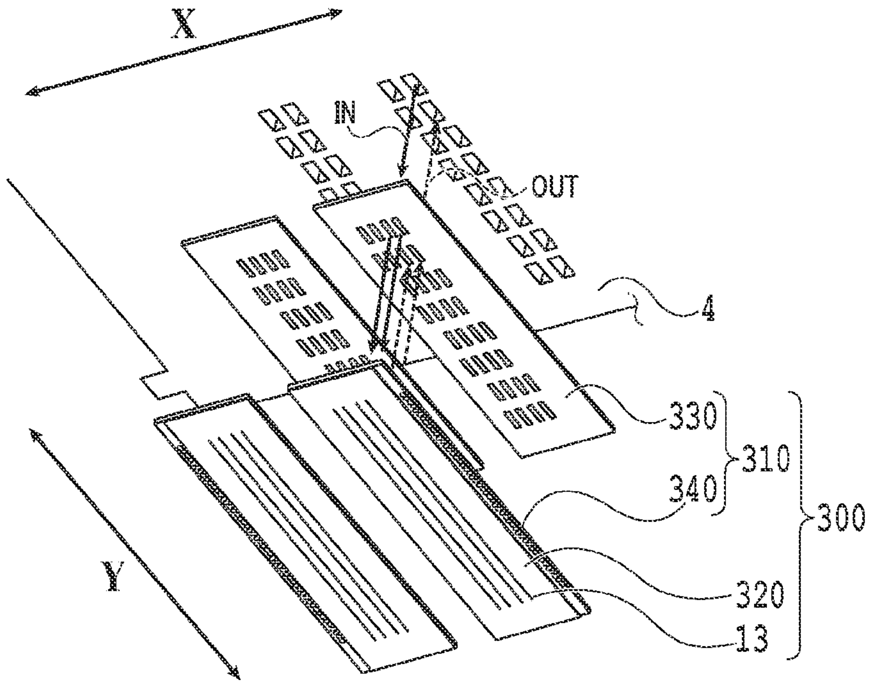
Figure 12:
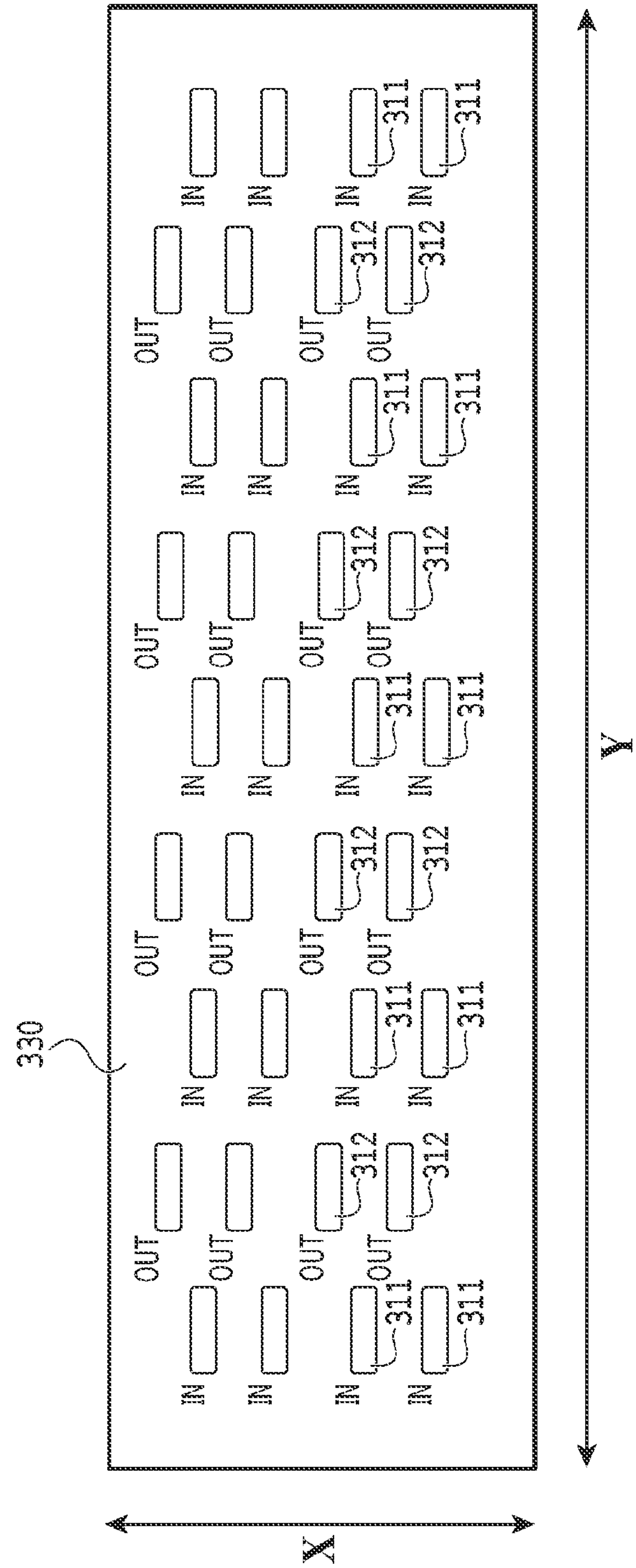
FIG. 12 is a diagram illustrating an aperture plate.
Figure 13:
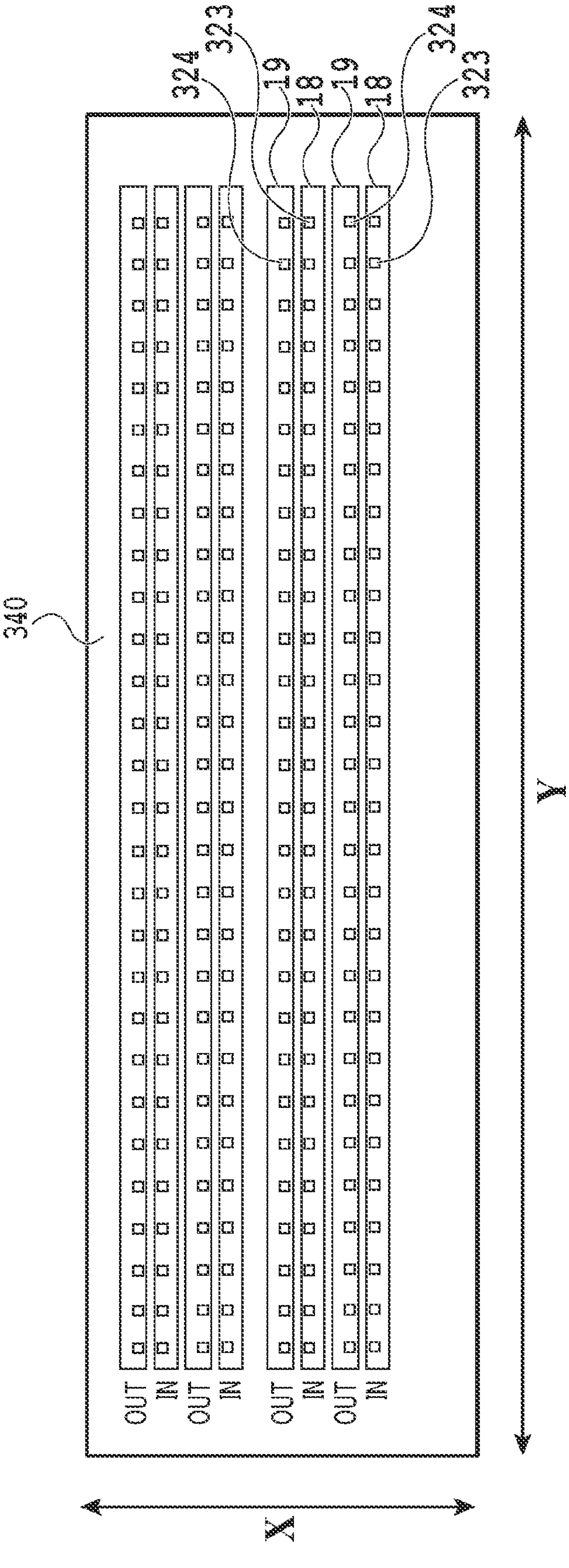
FIG. 13 is a diagram illustrating an ejection element substrate.

FIG. 11A and FIG. 11B are schematic diagrams illustrating a circulation channel for one color of ink in the ejection unit 3 of the present embodiments. FIG. 11A is an exploded perspective view of the ejection unit 3 viewed from the first support member 4 side, and FIG. 11B is an exploded perspective view of the ejection unit 3 viewed from the ejection module 300 side. Note that the arrows shown with IN and OUT in the drawings indicate the flows of ink, and, although the flows of ink for only one color are explained, the flows for other colors are the same. Further, in FIG. 11A and FIG. 11B, descriptions of the second support member 7 and the electric wiring member 5 are omitted, and the descriptions are also omitted in the following explanation of the configuration of the ejection unit. Further, the first support member 4 illustrated in FIG. 11A corresponds to a cross section taken along XI-XI of FIG. 3A. The ejection module 300 is equipped with the ejection element substrate 340 and the aperture plate 330. FIG. 12 is a diagram illustrating the aperture plate 330, and FIG. 13 is a diagram illustrating the ejection element substrate 340.

Ink is supplied to the ejection unit 3 from the circulation unit 54 via the joint member 8 (see FIG. 3A). The channel of the ink after passing through the joint member 8 until returning to the joint member 8 is explained. Note that the description of the joint member 8 is omitted in the following drawings.

The ejection module 300 includes the ejection element substrate 340 and aperture plate 330 configuring the silicon substrate 310 and, further, includes the ejection port forming member 320. The ejection element substrate 340, the aperture plate 330, and the ejection port forming member 320 are adjoined in an overlapped manner so that the respective ink channels communicate with each other, so as to form the ejection module 300, which is supported by the first support member 4. The ejection module 300 is supported by the first support member 4, and thus the ejection unit 3 is formed. The ejection element substrate 340 includes the ejection port forming member 320, and the ejection port forming member 320 includes multiple ejection port arrays in which the multiple ejection ports 13 from arrays, so that a part of the ink supplied via the ink channels in the ejection module 300 is ejected from the ejection ports 13. Ink that has not been ejected is collected via the ink channels in the ejection module 300.

As illustrated in FIG. 11A to FIG. 12, the aperture plate 330 includes the multiple arrays of the ink supply ports 311 and the multiple arrays of the ink collection ports 312. As illustrated in FIG. 13 to FIG. 14C, the ejection element substrate 340 includes the multiple arrays of the supply connection channels 323 and the multiple arrays of the collection connection channels 324. Further, the ejection element substrate 340 includes the common supply channels 18 that communicate with the multiple supply connection channels 323 and the common collection channels 19 that communicate with the multiple collection connection channels 324. The ink channels in the ejection unit 3 are formed by making the ink supply channel 48 and the ink collection channel 49 (see FIG. 3A) installed in the first support member 4 communicate with the channels installed in the ejection module 300. The support member supply port 211 is a cross-sectional aperture forming the ink supply channel 48, and the support member collection port 212 is a cross-sectional aperture forming the ink collection channel 49.

The ink supplied to the ejection unit 3 is supplied from the circulation unit 54 side (see FIG. 3A) to the ink supply channel 48 (see FIG. 3A) of the first support member 4. The ink that has flowed through the support member supply port 211 in the ink supply channel 48 is supplied to the common supply channels 18 of the ejection element substrate 340 via the ink supply channel 48 (see FIG. 3A) and the ink supply ports 311 of the aperture plate 330 and enters the supply connection channels 323. The channels up to this point are the channels on the supply side. Thereafter, the ink flows through the pressure chambers 12 (see FIG. 3B) of the ejection port forming member 320 into the collection connection channels 324, which are the channels on the collection side. The detail of the ink flow in the pressure chambers 12 is described later.

In the channels on the collection side, the ink that has entered the collection connection channels 324 flows into the common collection channels 19. Thereafter, the ink flows from the common collection channels 19 to the ink collection channel 49 of the first support member 4 via the ink collection ports 312 of the aperture plate 330 and passes through the support member collection port 212, so as to be collected by the circulation unit 54.

The area of the aperture plate 330 without the ink supply ports 311 and the ink collection ports 312 corresponds to the area of the first support member 4 for partitioning the support member supply port 211 and the support member collection port 212. Further, the first support member 4 also does not have an aperture in the area. Such an area is used as a bonding area for such a case in which the ejection module 300 and the first support member 4 are bonded.

In the aperture plate 330 of FIG. 12, arrays of multiple apertures arranged in the X direction are installed so as to form multiple arrays in the Y direction, and the arrays are alternately arranged in the Y direction so that the apertures for supply (IN) and the apertures for collection (OUT) are shifted by half a pitch in the X direction. In the ejection element substrate 340 of FIG. 13, the arrays of the common supply channels 18, which communicate with the arrays of multiple supply connection channels 323 arranged in the Y direction, and the common collection channels 19, which communicate with the arrays of multiple collection connection channels 324 arranged in the Y direction, are alternately arranged in the X direction. The common supply channels 18 and the common collection channels 19 are separated for the respective types of ink, and, further, the number of common supply channels 18 and common collection channels 19 to be arranged is determined according to the number of ejection port arrays for the respective colors. Further, the number of arranged supply connection channels 323 and collection connection channels 324 corresponds to the ejection ports 13. Note that the one-to-one correspondence is not necessarily required, and one supply connection channel 323 and one collection connection channel 324 may correspond to multiple ejection ports 13.

The above-described aperture plate 330 and ejection element substrate 340 are adjoined in an overlapping manner so that the respective ink channels communicate with each other to form the ejection module 300, and, by being supported by the first support member 4, such ink channels equipped with the supply channels and the collection channels as described above are formed.

Figure 14A:
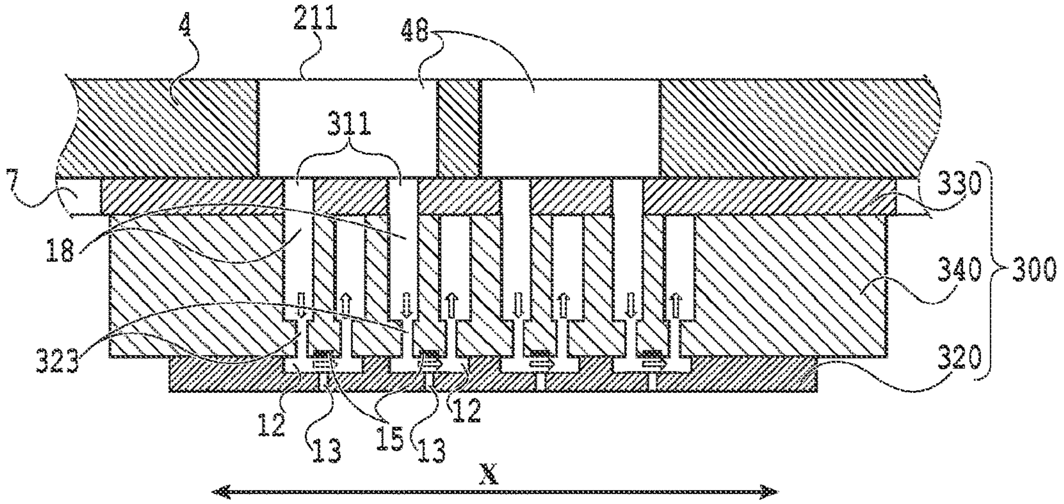
FIG. 14A to FIG. 14C are cross-sectional views illustrating the flow of ink in the ejection unit.
Figure 14B:
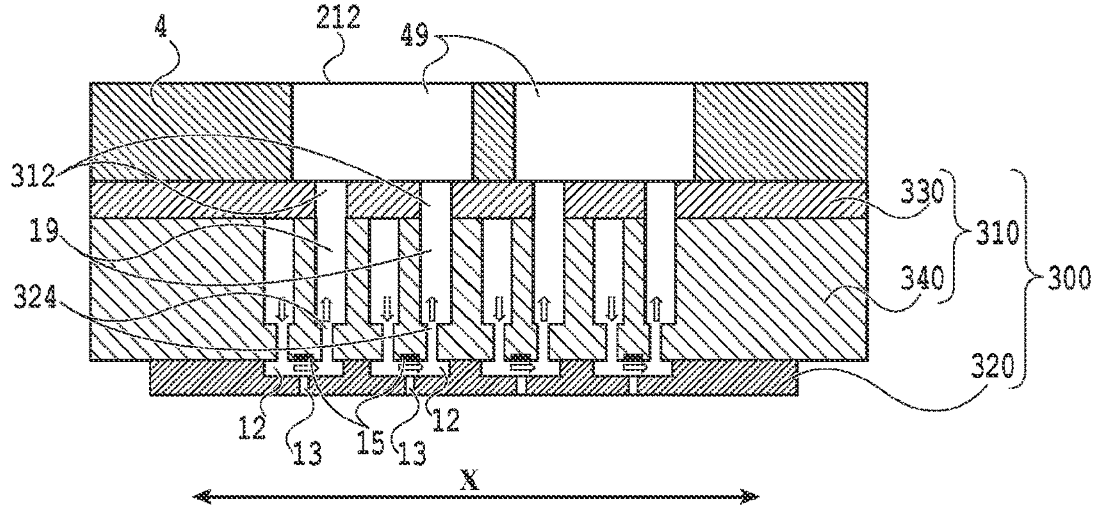
Figure 14C:
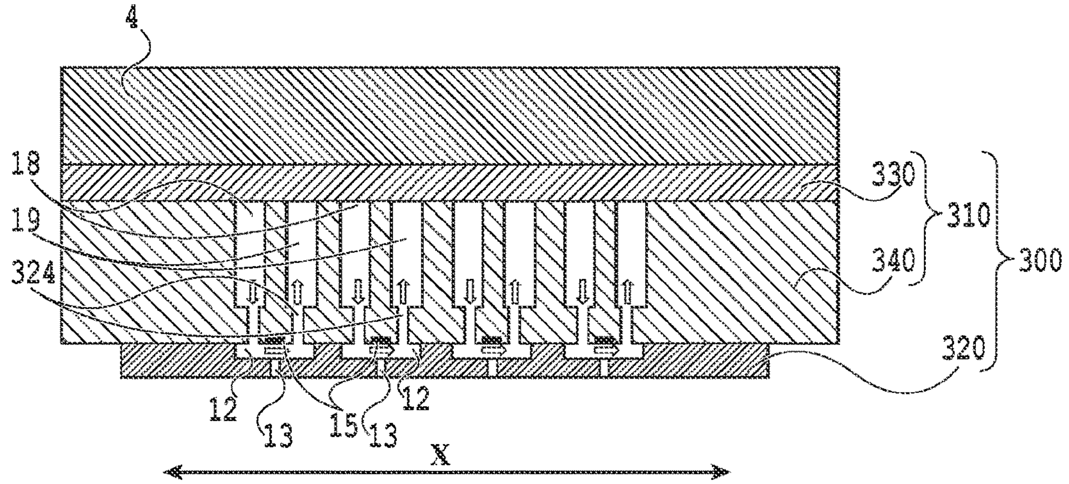

FIG. 14A to FIG. 14C are cross-sectional views illustrating ink flows in different parts of the ejection unit 3. FIG. 14A is a cross section taken along line XIVA-XIVA of FIG. 11A, wherein a cross section of a portion where the ink supply channels 48 and the ink supply ports 311 in the ejection unit 3 communicate with each other is illustrated. Further, FIG. 14B is a cross section taken along line XIVB-XIVB of FIG. 11A, wherein a cross section of a portion where the ink collection channels 49 and the ink collection ports 312 in the ejection unit 3 communicate with each other is illustrated. Further, FIG. 14C is a cross section taken along line XIVC-XIVC of FIG. 11A, wherein a cross section of a portion where the ink supply ports 311 and the ink collection ports 312 do not communicate with the channels of the first support member 4 is illustrated.

In the supply channels for supplying ink, as illustrated in FIG. 14A, ink is supplied from the portion where the ink supply channels 48 of the first support member 4 and the ink supply ports 311 of the aperture plate 330 are overlapped to communicate with each other. Further, in the collection channels for collecting ink, as illustrated in FIG. 14B, ink is collected from the portion where the ink collection channels 49 of the first support member 4 and the ink collection ports 312 of the aperture plate 330 are overlapped to communicate with each other. Further, as illustrated in FIG. 14C, the ejection unit 3 includes a partial area of the aperture plate 330 with no apertures. In such an area, ink is neither supplied nor collected between the ejection element substrate 340 and the first support member 4. Ink is supplied in the area equipped with the ink supply ports 311 as illustrated in FIG. 14A, and ink is collected in the area equipped with the ink collection ports 312 as illustrated in FIG. 14B. Note that, although the configuration with the aperture plate 330 is explained as an example in the present embodiments, a form without the aperture plate 330 is also possible. For example, such a configuration in which channels corresponding to the ink supply channels 48 and the ink collection channels 49 are formed in the first support member 4 and the ejection element substrate 340 is adjoined to the first support member 4 is also possible.

Figure 15A:
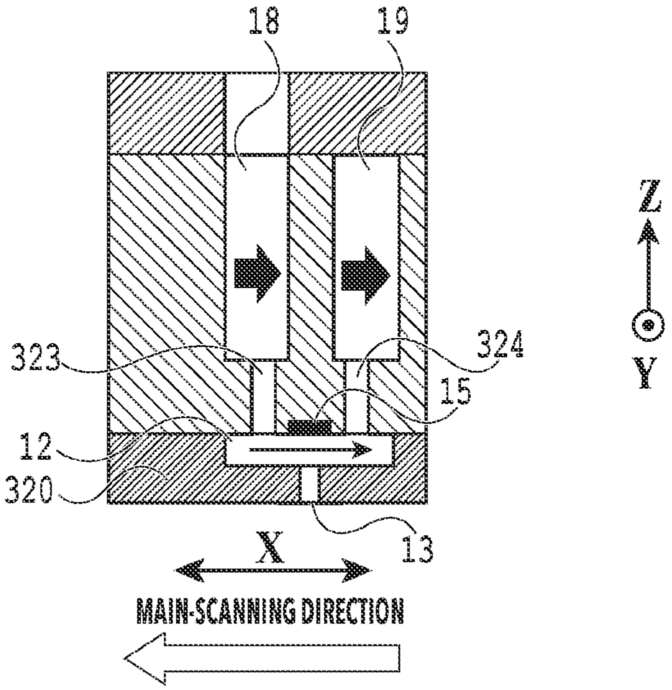
FIG. 15A and FIG. 15B are cross-sectional views illustrating the vicinity of an ejection port.
Figure 15B:
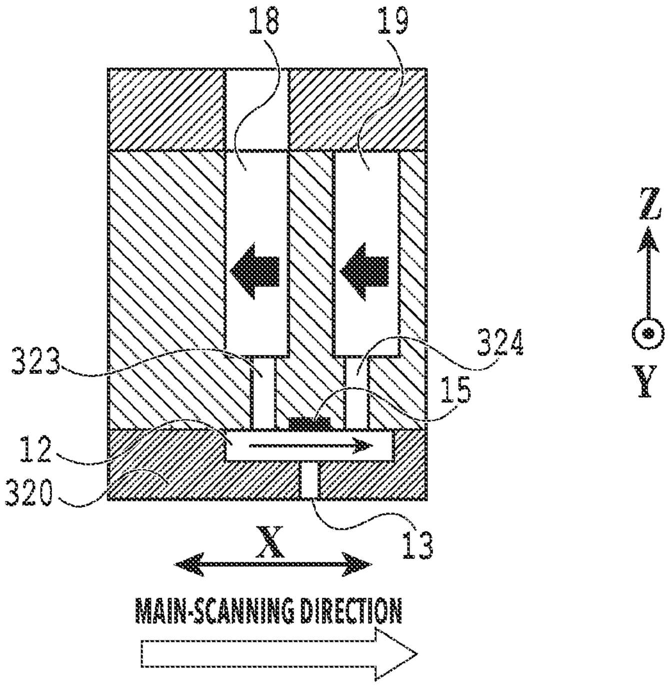
Figure 16A:
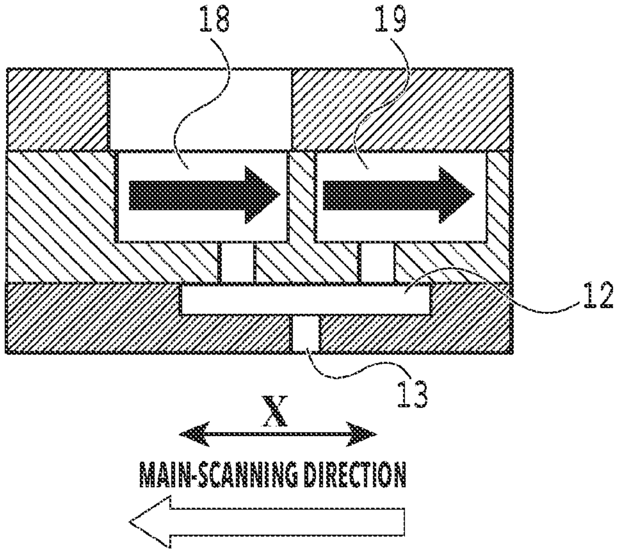
FIG. 16A and FIG. 16B are cross-sectional views illustrating a comparative example of the vicinity of an ejection port.
Figure 16B:
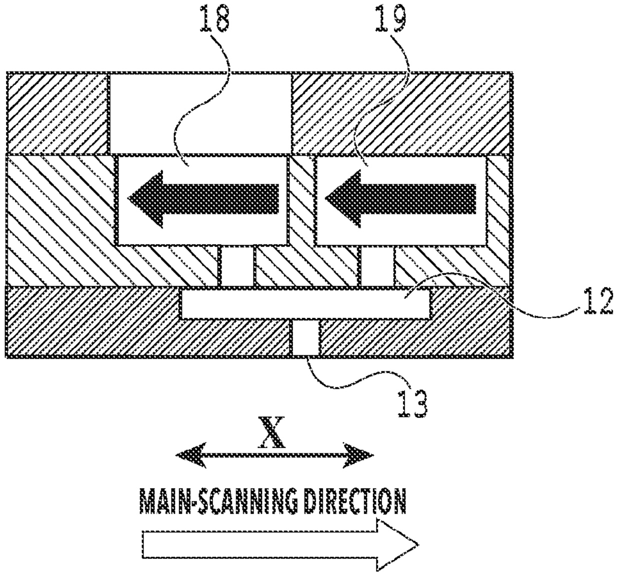

FIG. 15A and FIG. 15B are cross-sectional views illustrating the vicinity of the ejection port 13 in the ejection module 300, and FIG. 16A and FIG. 16B are cross-sectional views illustrating an ejection module with a configuration in which the common supply channel 18 and the common collection channel 19 are widened in the X direction as a comparative example. Note that, the thick arrows illustrated in the common supply channel 18 and the common collection channel 19 in FIG. 15A to FIG. 16B indicate the rocking movements of the ink in the form using the serial type liquid ejection apparatus 50. The ink supplied to the pressure chamber 12 through the common supply channel 18 and the supply connection channel 323 is ejected from the ejection port 13 by driving of the ejection element 15. In a case where the ejection element 15 is not driven, the ink is collected from the pressure chamber 12 to the common collection channel 19 through the collection connection channel 324 which is a collection channel.

In the form using the serial type liquid ejection apparatus 50, in a case where ejection is performed with the ink circulating in this way, the ejection of ink is more or less influenced by the rocking movement of the ink in the ink channel due to the main-scanning of the liquid ejection head 1. Specifically, the influence of the rocking movement of the ink in the ink channel may appear as a difference in the ink ejection amount or a deviation in the ejection direction. As in FIG. 16A and FIG. 16B, in a case where the common supply channel 18 and the common collection channel 19 have wide cross-sectional shapes in the X direction, which is the main-scanning direction, the ink in the common supply channel 18 and the common collection channel 19 is susceptible to inertial force in the main-scanning direction, which causes large rocking movement of the ink. As a result, there is a possibility that the ink ejection from the ejection port 13 is influenced by the rocking movement of the ink. Further, if the common supply channel 18 and the common collection channel 19 are widened in the X direction, the distances between colors are to be widened, which may reduce the printing efficiency.

Therefore, the common supply channel 18 and the common collection channel 19 of the present embodiments are configured so as to extend in the Y direction but also extend in the Z direction perpendicular to the X direction, which is the main-scanning direction, as in both of the cross sections illustrated in FIG. 15A and FIG. 15B. With such a configuration, the channel width of each of the common supply channel 18 and the common collection channel 19 in the main-scanning direction can be reduced. By reducing the channel width of each of the common supply channel 18 and the common collection channel 19 in the main-scanning direction, the rocking movement of ink caused by the inertial force during main-scanning (the thick black arrows in the drawings) that acts toward the opposite side of the main-scanning direction on the ink in the common supply channel 18 and the common collection channel 19 is reduced. Accordingly, it is possible to suppress the influence on the ejection of the ink due to the rocking movement of the ink. Further, the cross-sectional areas are increased by extending the common supply channel 18 and the common collection channel 19 in the Z direction, so as to reduce pressure drops of the channels.

As described above, by reducing the channel width of each of the common supply channel 18 and the common collection channel 19 in the main-scanning direction, the rocking movement of ink in the common supply channel 18 and the common collection channel 19 during main-scanning is reduced, but the rocking movement is not eliminated. Therefore, in the present embodiments, the common supply channel 18 and the common collection channel 19 are arranged to be overlapped with respect to the X direction in order to suppress the occurrence of a difference in ejection for each ink type that may still occur due to the reduced rocking movement.

As described above, in the present embodiments, the supply connection channels 323 and the collection connection channels 324 are installed so as to correspond to the ejection ports 13, and the supply connection channels 323 and the collection connection channels 324 have a correspondence relationship of being arranged side by side in the X direction with the ejection ports 13 sandwiched therebetween. Therefore, there is a portion where the common supply channels 18 and the common collection channels 19 do not overlap in the X direction, and, if the correspondence relationship between the supply connection channels 323 and the collection connection channels 324 is lost, the flow of the ink in the pressure chambers 12 in the X direction and ejection are influenced. With the influence of the rocking movement of ink in addition to that, there is a possibility that ejection of ink from each ejection port is further affected.

Therefore, by arranging the common supply channels 18 and the common collection channels 19 at positions overlapping each other with respect to the X direction, the rocking movement of ink is substantially the same in the common supply channels 18 and the common collection channels 19 during the main-scanning at any positions in the Y direction in which the ejection ports 13 are arranged. As a result, the pressure difference between the common supply channel 18 side and the common collection channel 19 side that occurs in the pressure chamber 12 does not significantly fluctuate, so that stable ejection can be performed.

Further, in some liquid ejection heads that circulate ink, the channels for supplying ink to the liquid ejection head and the channels for collecting ink are configured of the same channels. However, in the present embodiments, the common supply channels 18 and the common collection channels 19 are separate channels. Further, the supply connection channels 323 and the pressure chambers 12 communicate with each other, the pressure chambers 12 and the collection connection channels 324 communicate with each other, and ink is ejected from the ejection ports 13 of the pressure chambers 12. That is, the pressure chambers 12, which are channels connecting the supply connection channels 323 and the collection connection channels 324, are configured with the ejection ports 13. Therefore, the ink flow flowing from the supply connection channel 323 side to the collection connection channel 324 side is generated in the pressure chambers 12, so that the ink in the pressure chambers 12 is efficiently circulated. By efficiently circulating the ink in the pressure chambers 12, the ink in the pressure chambers 12, which is susceptible to the influence of evaporation of the ink from the ejection ports 13, can be kept fresh.

Further, since the two channels, i.e., the common supply channels 18 and the common collection channels 19, communicate with the pressure chambers 12, in a case where ejection at a high flow rate needs to be performed, ink can be supplied from both of the channels. That is, compared to a configuration in which ink supply and collection are configured with only one channel, the configuration of the present embodiments not only enables efficient circulation but also has a benefit of being capable of ejection with a high flow rate.

Further, if the common supply channels 18 and the common collection channels 19 are arranged close to each other in the X direction, the influence of the rocking movement of ink is less likely to occur. Desirably, the distance between the channels is configured to be 75 μm to 100 μm.

Figure 17:
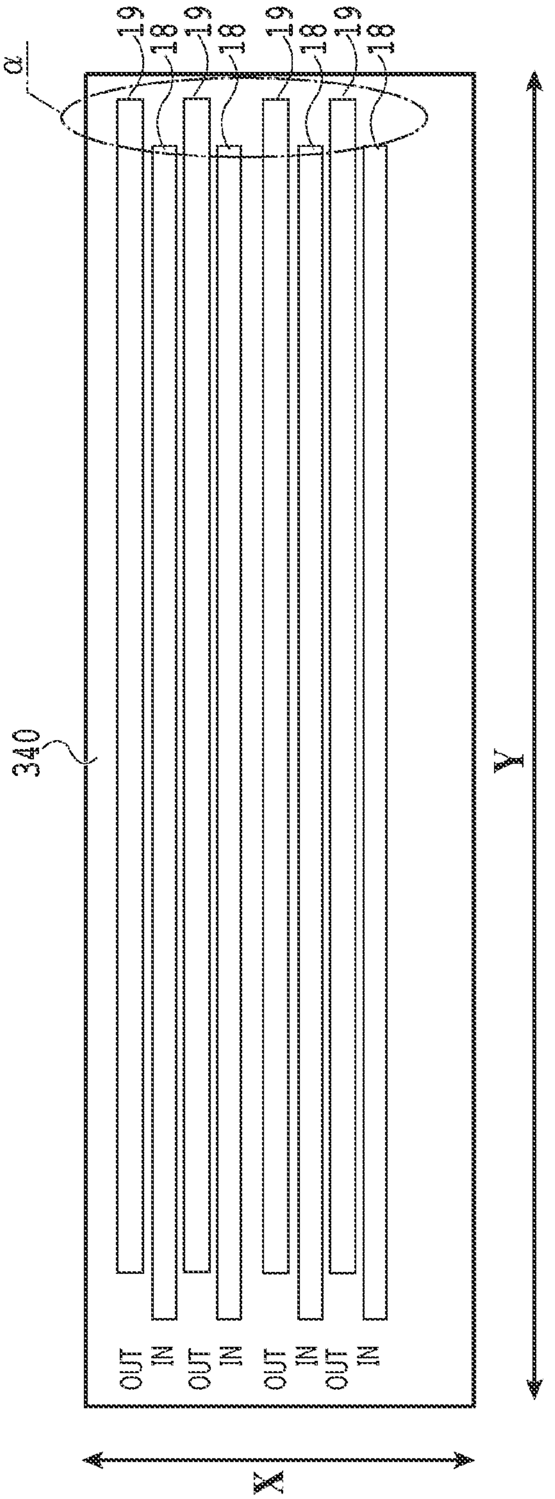
FIG. 17 is a diagram illustrating a comparative example of the ejection element substrate.

FIG. 17 is a diagram illustrating the ejection element substrate 340 as a comparative example. Note that, in FIG. 17, descriptions of the supply connection channels 323 and the collection connection channels 324 are omitted. Since ink that has received thermal energy from the ejection elements 15 in the pressure chambers 12 flows into the common collection channels 19, ink with a relatively high temperature flows therein, compared to the temperature of the ink in the common supply channels 18. Here, in the comparative example, there is a portion where only the common collection channels 19 exist in a part of the ejection element substrate 340 in the X direction, such as the a part enclosed with the long dashed short dashed line of FIG. 17. In this case, the temperature rises locally at that portion, and thus temperature variations that occur in the ejection module 300 may affect ejection.

Ink with a relatively low temperature flows through the common supply channels 18, compared to that in the common collection channels 19. Therefore, if the common supply channels 18 and the common collection channels 19 are adjacent to each other, the temperatures in the common supply channels 18 and the common collection channels 19 are partially offset in the vicinities thereof, and thus the increase in the temperature can be suppressed. Thus, it is preferable that the common supply channels 18 and the common collection channels 19 have approximately the same length and exist at positions overlapping each other in the X direction so as to be adjacent to each other.

Figure 18A:
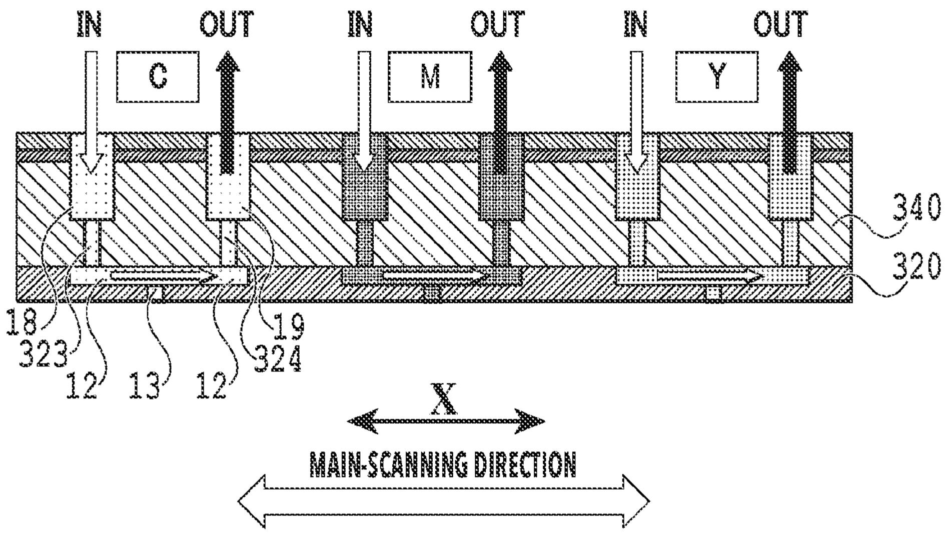
FIG. 18A and FIG. 18B are diagrams illustrating a channel configuration of the liquid ejection head.
Figure 18B:
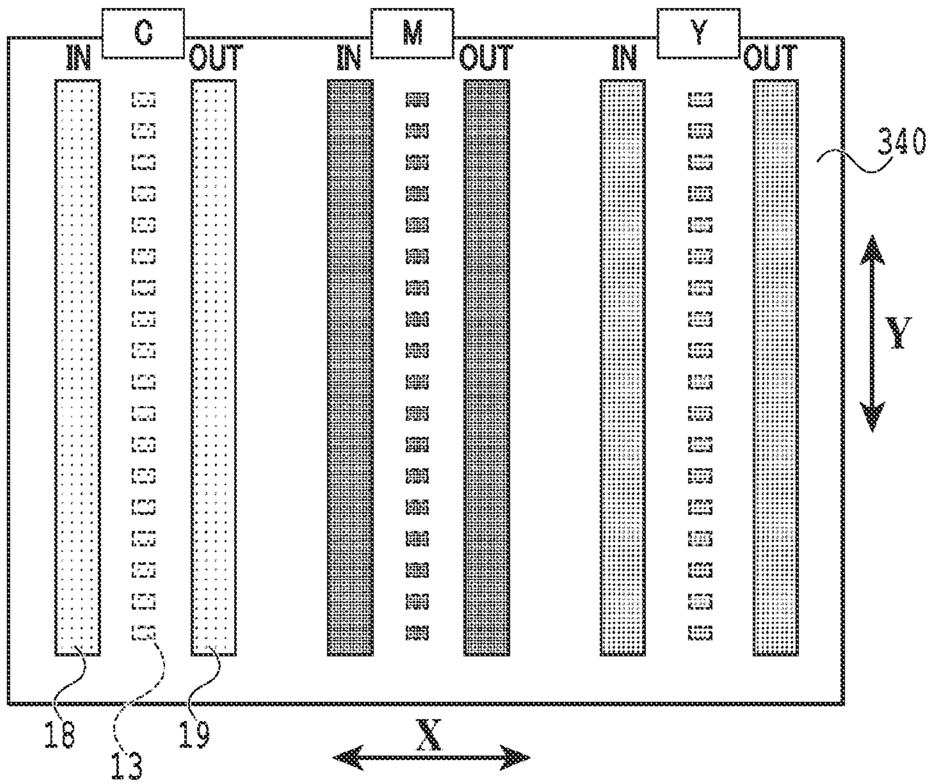

FIG. 18A and FIG. 18B are diagrams illustrating the channel configuration of the liquid ejection head 1 corresponding to the three colors of ink, i.e., cyan (C), magenta (M), and yellow (Y). In the liquid ejection head 1, a circulation channel is installed for each type of ink as in FIG. 18A. The pressure chambers 12 are installed along the X direction, which is the main-scanning direction of the liquid ejection head 1, Further, as in FIG. 18B, the common supply channels 18 and the common collection channels 19 are installed along the ejection port arrays in which the ejection ports 13 are arranged so that the common supply channels 18 and the common collection channels 19 extending in the Y direction sandwich the ejection port arrays.

<Connection of the Main Body Part and the Liquid Ejection Head>

Figure 19:
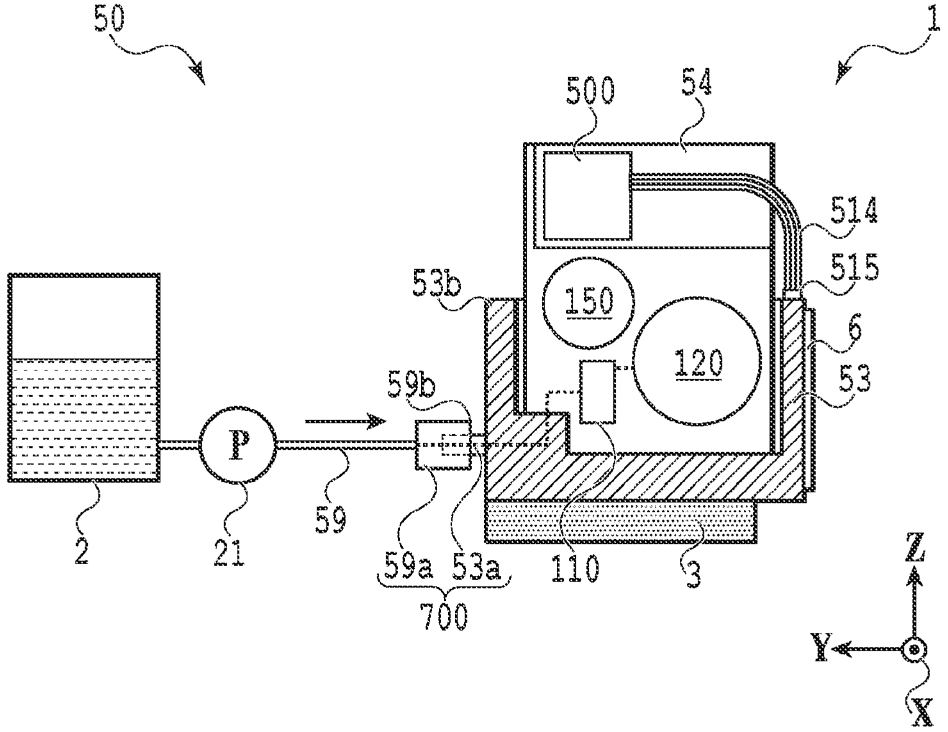
FIG. 19 is a diagram illustrating a connection state between a main body part of the liquid ejection apparatus and the liquid ejection head.

FIG. 19 is a schematic configuration diagram illustrating the connection state of the liquid ejection head 1 and the ink tank 2 as well as the external pump 21, which are installed for the main body part of the liquid ejection apparatus 50 of the present embodiments, and the arrangement of the circulating pump, etc., in more detail. The liquid ejection apparatus 50 according to the present embodiments has such a configuration in which only the liquid ejection head 1 can be easily replaced if a problem occurs in the liquid ejection head 1. Specifically, the liquid connecting part 700 that allows easy connection and disconnection between the ink supply tube 59 connected to the external pump 21 and the liquid ejection head 1 is included. Thus, it is possible to easily attach and detach only the liquid ejection head 1 to and from the liquid ejection apparatus 50.

As illustrated in FIG. 19, the liquid connecting part 700 includes the liquid connector inlet 53*a* installed so as to protrude from the head case 53 of the liquid ejection head 1, and the cylindrical liquid connector 59*a* into which this liquid connector inlet 53*a* can be inserted. The liquid connector inlet 53*a* is fluidly connected to the ink supply channels formed in the liquid ejection head 1 and is connected to the first pressure adjusting unit 120 via the above-described filter 110. Further, the liquid connector 59*a* is installed at the tip of the ink supply tube 59 connected to the external pump 21 for pressurizing and supplying the ink in the ink tank 2 to the liquid ejection head 1.

As described above, the liquid ejection head 1 illustrated in FIG. 19 can be easily attached, detached, and replaced by the liquid connecting part 700. However, in a case where the sealing performance between the liquid connector inlet 53*a* and the liquid connector 59*a* is deteriorated, there is a possibility that the ink pressurized and supplied by the external pump 21 leaks from the liquid connecting part 700. If the leaked ink adheres to the circulation pump 500 or the like, there is a possibility that a malfunction occurs in the electrical system. Therefore, in the present embodiments, the circulation pump, etc., are arranged as described below.

<Arrangement of the Circulation Pump, Etc.>

As illustrated in FIG. 19, in the present embodiments, the circulation pump 500 is arranged above the liquid connecting part 700 in the direction of gravity, in order to prevent the ink leaking from the liquid connecting part 700 from adhering to the circulation pump 500. That is, the circulation pump 500 is arranged above the liquid connector inlet 53*a*, which is a liquid inlet of the liquid ejection head 1, in the direction of gravity. Furthermore, the circulation pump 500 is arranged at a position not in contact with the members configuring the liquid connecting part 700. Thus, even if ink leaks from the liquid connecting part 700, the ink flows in the horizontal direction, which is the direction of the aperture of the liquid connector 59*a*, or downward in the direction of gravity, so that it is possible to suppress the ink from reaching the circulation pump 500 which is located above in the direction of gravity. Further, since the circulation pump 500 is arranged at a position distant from the liquid connecting part 700, the possibility that the ink reaches the circulation pump 500 through the members is reduced as well.

Further, the electric connecting part 515 for electrically connecting the circulation pump 500 and the electric contact substrate 6 via the flexible wiring member 514 is installed above the liquid connecting part 700 in the direction of gravity. Therefore, it is possible to reduce the possibility that electrical troubles occur due to the ink from the liquid connecting part 700.

Further, in the present embodiments, since the wall part 52*b* of the head case 53 is installed, even if ink squirts out of the aperture 59*b* of the liquid connecting part 700, the ink is blocked, so that it is possible to reduce the possibility that the ink reaches the circulation pump 500 and the electric connecting part 515.

First Embodiment

Figure 20:
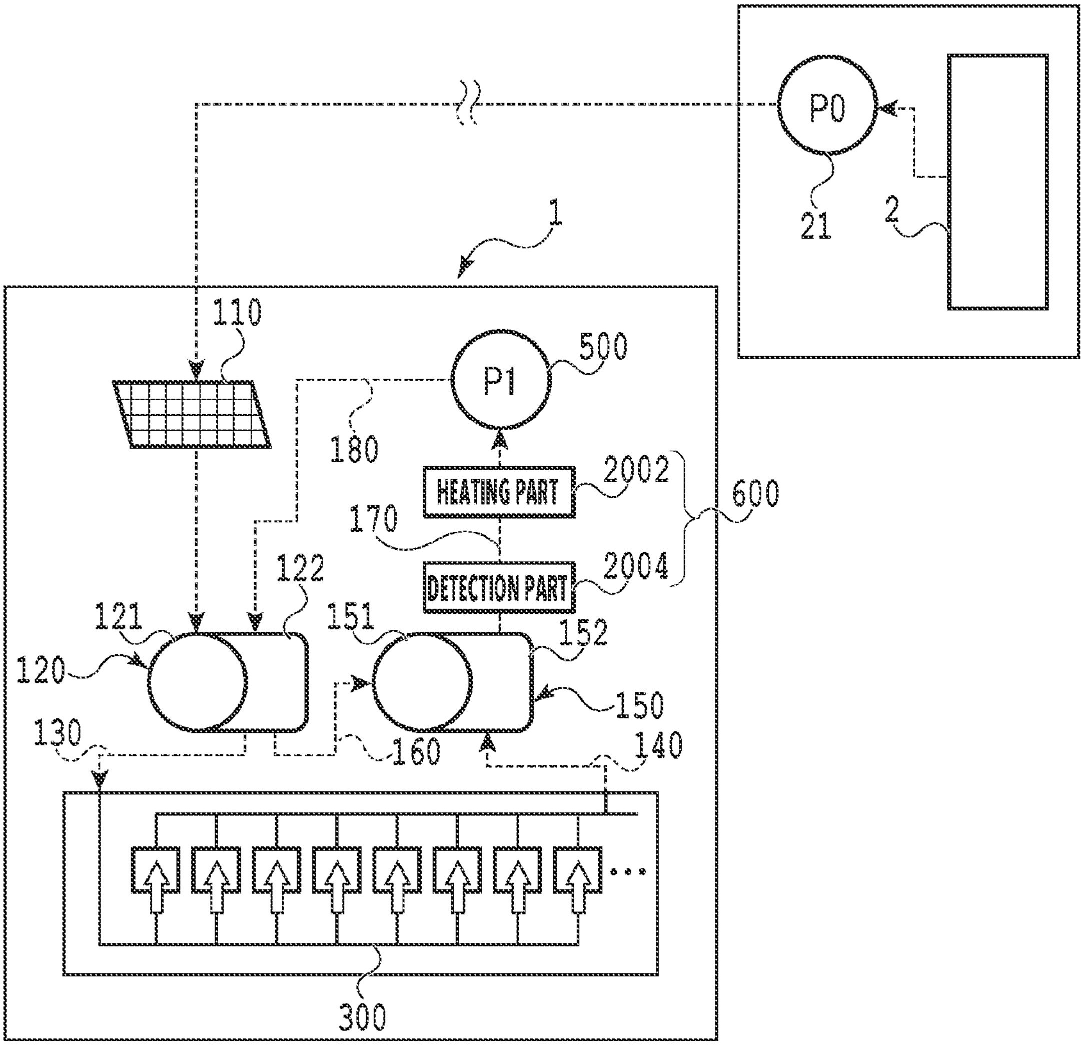
FIG. 20 is a schematic configuration diagram of the circulation channel in the liquid ejection head.

Next, with reference to FIG. 20, an explanation is given of the configuration of the liquid ejection head according to the first embodiment of the present disclosure. FIG. 20 is a schematic configuration diagram of a circulation channel.

In printing apparatuses that perform printing in an inkjet system, industrial inks with high viscosity and the like are used in order to easily perform high-quality printing on a print medium with no ink absorbency, such as a resin film with no ink absorbency. In a case where high-viscosity ink is ejected from a liquid ejection head in an inkjet system, an ejection failure may occur. Ink generally has the characteristic of changing its viscosity according to its temperature. Therefore, in order to suppress ejection failures caused by the viscosity of the ink, a technique in which the ink ejected by an ejection element is adjusted to a predetermined temperature, e.g., heated to a predetermined temperature, is known.

However, since the publicly-known printing apparatuses are configured to circulate ink between a liquid ejection head and a sub-tank installed separately from the liquid ejection head, the circulation channel is long, and thus the temperature of a large amount of ink has been adjusted. Therefore, in the present embodiment, a circulation channel in which the amount of circulating ink is less than that of the publicly-known techniques is formed in the liquid ejection head 1 as described above, and a beating part is installed in this circulation channel as a temperature adjusting unit that adjusts the temperature of the circulating ink.

As described above, in the present embodiment, the circulation channel is configured with the two channels (see FIG. 6). One is a channel connecting the first valve chamber 121, the first pressure control chamber 122, the ejection module 300, and the second pressure control chamber. The other is a channel connecting the first pressure control chamber 122, the second valve chamber 151, the second pressure control chamber 152, the circulation pump 500, and the first pressure control chamber 122. The total volume of the circulation channel configured with these two channels is, for example, less than 30 ml. Note that, the total volume is about 10 ml in the present embodiment.

Further, in such a circulation channel of the present embodiment, the heating part 2002 is included as the heating mechanism 600 between the second pressure control chamber 152 and the circulation pump 500 of the circulation unit 54, specifically, in the pump inlet channel 170 (see FIG. 20). That is, the heating part 2002 is located on the upstream side of the circulation pump 500 in the direction of the ink flow as well as on the downstream side of the second pressure adjusting unit 150 in that direction. The heating part 2002 may have a configuration capable of directly heating the ink flowing through the pump inlet channel 170 or may have a configuration capable of indirectly heating the ink. Further, the arrangement position of the heating part 2002 in the circulation channel is not limited to in the pump inlet channel 170 and may be in the pump outlet channel 180. Alternatively, the supply channel 130, the collection channel 140, or the bypass channel 160 may be used, although the heating efficiency is slightly reduced.

Note that, although the heating part 2002 capable of heating ink is included as a temperature adjusting unit for adjusting the temperature of the ink in the present embodiment, there is not a limitation as such. That is, in a case where the temperature of ink tends to rise due to the heat generated by the internal mechanism of the printing apparatus, the temperature of the ink may rise above the temperature range in which ink can be properly ejected. In such a case, it is also possible that a cooling part capable of cooling the ink is included as the temperature adjusting unit. Note that it is also possible to include both of the heating part and the cooling part as the temperature adjusting unit.

For example, the heating part 2002 is connected to the head driver 1A (see FIG. 1B), so that its driving is controlled by the CPU 103 via the head driver 1A. Further, in the circulation channel, the detection part 2004 capable of detecting the temperature of the ink is installed on the upstream side of the heating part 2002, for example. Specifically, the detection part 2004 configures a heating mechanism together with the heating part 2002 and is installed on the upstream side of the heating part 2002 in the pump inlet channel 170, for example. The detection part 2004 is connected to the head driver 1A, so that detection results are output to the CPU 103 via the head driver 1A. The CPU 103 controls the driving of the heating part 2002, based on detection results of the detection part 2004. Note that the detection part 2004 may be arranged anywhere as long as it is a position capable of detecting the temperature of the ink in the circulation channel. Further, the detection unit may be configured to directly detect the temperature of the ink in the circulation channel or may be configured to indirectly detect the temperature.

As described above, the ejection module 300 configuring the circulation channel is configured to be kept at a constant temperature by a temperature adjusting mechanism (not illustrated in the drawings). However, as described above, one of the two channels configuring the circulation channel does not include the ejection module 300. Therefore, the temperature adjusting mechanism that keeps the ejection module 300 at a constant temperature takes time to adjust the temperature of the ink in the circulation channel within the proper temperature range. On the other hand, with the configuration in which the heating part 2002 is installed on the upstream side of the circulation pump 500, the ink sent by the circulation pump 500 can be heated right before being sent, and thus it is possible to efficiently rise the temperature of the ink in the circulation channel.

Further, regarding the ink flowing through the circulation channel according to the present embodiment, for example, in a case where the sum of the contained pigment and resin particles is 10% or more of the total amount of the ink, the effect of reducing the viscosity by the heating part 2002 appears remarkably. Furthermore, in the case of a serial type printing apparatus, for the purpose of dispersing power consumption, it is desirable that the ink is heated by the heating part 2002 before performing scanning in the main-scanning direction (predetermined direction) with the carriage 60 so that the temperature of the ink is heated up within the predetermined temperature range. Further, although a serial type printing apparatus is illustrated as an example in the present embodiment, the printing apparatus to which the present embodiment can be applied is not limited to the example and may be applied to what is termed as a full-line type printing apparatus. Note that the detection part 2004 is not necessarily installed in the circulation channel.

As explained above, in the present embodiment, the ink circulation channel including the ejection module 300 is configured inside the liquid ejection head 1, and the heating part 2002 is installed in this circulation channel.

Thus, it is possible to reduce the total volume of the circulation channel, compared to a configuration in which ink is circulated via a liquid ejection head and a tank separately installed. Therefore, the amount of ink circulating in the circulation channel can be suppressed, and the time period for adjusting the temperature of the circulating ink within a predetermined temperature range can be shortened. As a result, productivity is improved.

Further, in the configuration in which ink is circulated via a liquid ejection head and a tank installed separately, each configuration is connected by a tube made of vinyl chloride or the like. On the other hand, by configuring the circulation unit 54, which configures most part of the circulation channel, from a resin material or the like, it is possible to improve the heat insulation property in the circulation channel and improve the thermal efficiency.

Second Embodiment

Figure 21A:
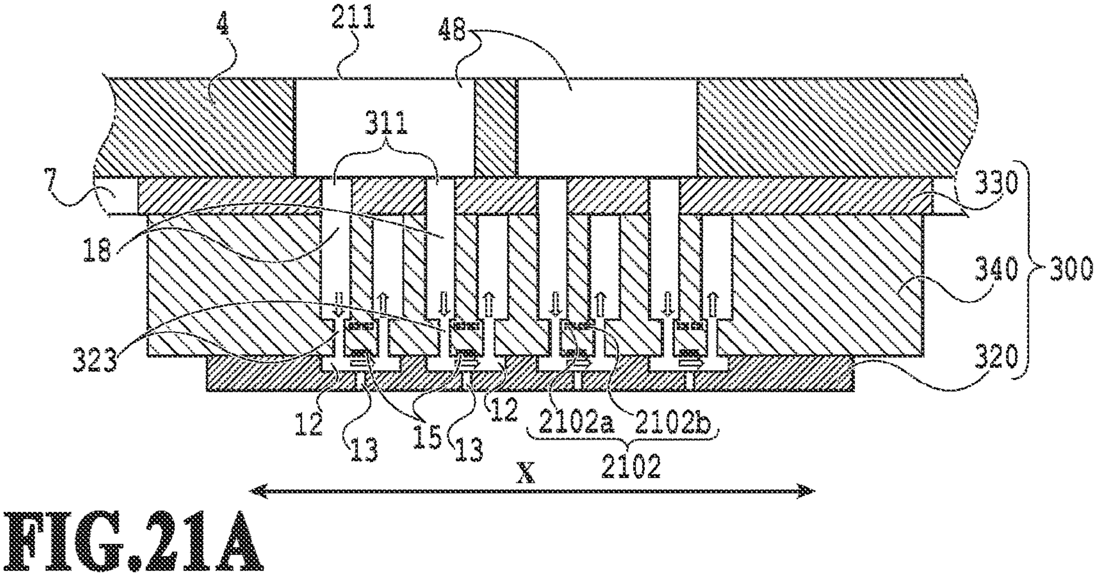
FIG. 21A to FIG. 21C are cross-sectional views of an ejection module equipped with a heating part.
Figure 21B:
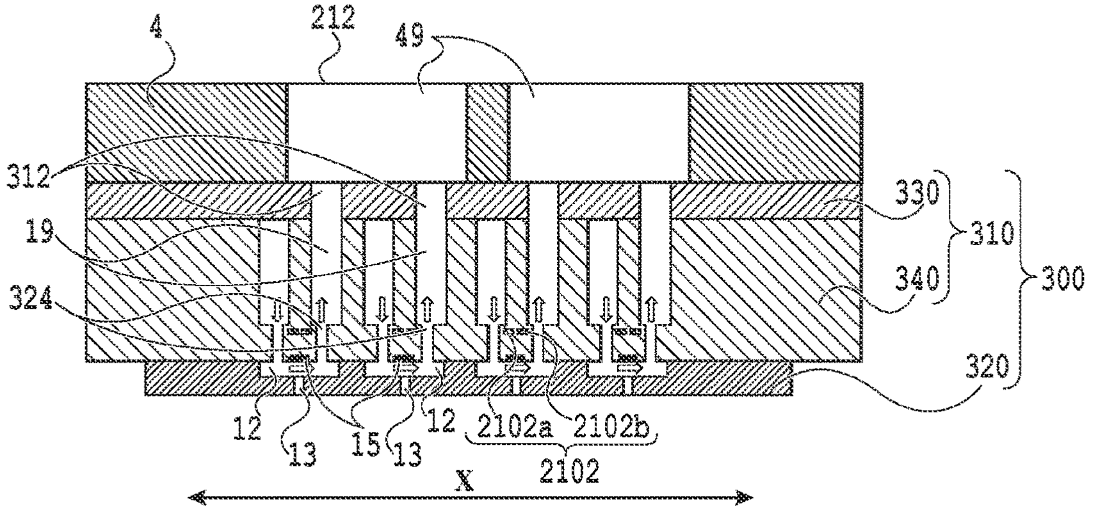
Figure 21C:
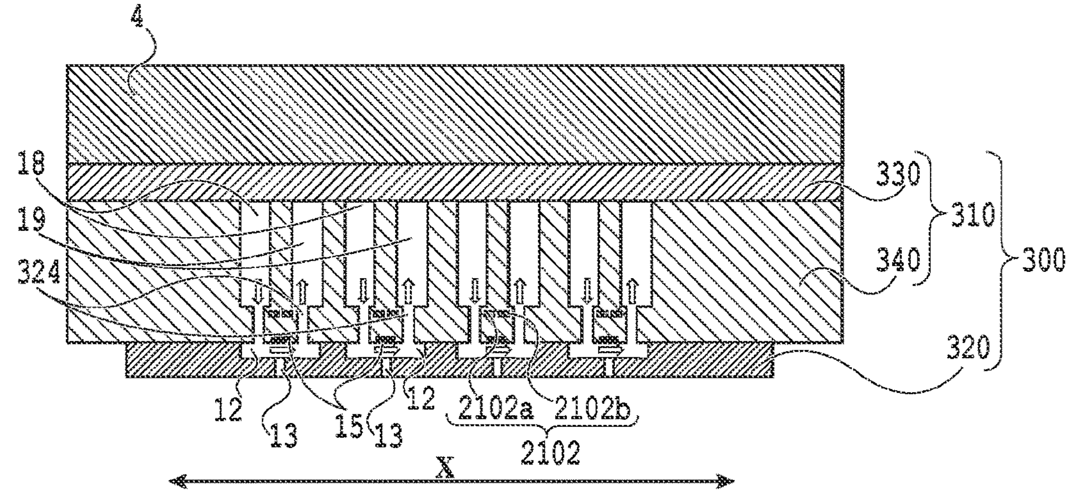

Next, with reference to FIG. 21A to FIG. 21C, an explanation is given of a liquid ejection head according to the second embodiment. In the following explanation, the same or corresponding configurations as those of the liquid ejection apparatus according to the first embodiment described above are assigned with the same signs as those used in the first embodiment, so as to omit detailed explanations thereof.

The second embodiment is different from the above-described first embodiment in an aspect that a heating part, which serves as a temperature adjusting unit for adjusting the temperature of ink, is installed in the ejection module 300. Note that, in the present embodiment, the heating part 2002 is not installed in the pump inlet channel 170 because of the configuration in which the heating part installed in the ejection module 300 heats the ink circulating in the circulation channel.

Depending on the type of ink to be used, solid bodies may precipitate at low temperatures. Further, for example, in a case of water-soluble ink, evaporation of water is accelerated in the vicinities of the ejection ports 13. For this reason, at the ejection ports 13 or in their vicinities, solid bodies are more likely to precipitate, compared to other locations in the circulation channel. Note that, in the following explanation, the solid bodies that precipitate are referred to as "precipitates", as appropriate. If such precipitates are formed at the ejection ports 13 or in their vicinities, ejection failures occur. In order to dissolve the precipitates locally formed at the ejection ports 13 and in their vicinities, it is required to effectively heat the precipitates. Note that, although a certain effect can be obtained by shortening the circulation channel and raising the temperature of the circulating ink in a short period of time, it is conceivable to heat the vicinities of the ejection ports 13 where precipitates are likely to be formed, in order to more effectively heat the precipitates. Therefore, in the present embodiment, as in FIG. 21A to FIG. 21C, the heating part 2102 is installed in the ejection module 300.

FIG. 21A to FIG. 21C are cross-sectional views of the ejection module 300 equipped with the beating part 2102, and the drawings correspond to FIG. 14A to FIG. 14C, respectively. That is, FIG. 21A is a cross-sectional view taken along line XIVA-XIVA of FIG. 11A, FIG. 21B is a cross-sectional view taken along line XIVB-XIVB of FIG. 11A, and FIG. 21C is a cross-sectional view taken along line XIVC-XIVC of FIG. 11A.

Specifically, in the present embodiment, a pair of heating parts 2102 is installed between the supply connection channel 323 and collection connection channel 324 corresponding each other in the ejection element substrate 340. Note that, by the supply connection channel 323 and collection connection channel 324 corresponding each other, it is indicated that they have such a relationship in which ink flows from the supply connection channel 323 to the collection connection channel 324 via the pressure chamber 12.

One heating part 2102*a* of the pair of heating parts 2102 extends along the Y direction at a position adjacent to the supply connection channels 323 over a range where the multiple supply connection channels 323 are installed. Further, the other heating part 2102*b* of the pair of heating parts 2102 extends along the Y direction at a position adjacent to the collection connection channels 324 over a range where the multiple collection connection channels 324 are installed. Note that the one heating part 2102*a* and the other heating part 2102*b* may be formed continuously in the Y direction or may be arranged partially or intermittently.

Thus, the pair of heating parts 2102 is installed between the supply connection channels 323 and collection connection channels 324 adjacent to the pressure chambers 12, in which the ejection ports 13 are installed, at positions adjacent to these channels. Thus, together with the ink in the supply connection channels 323 and the collection connection channels 324, the ink in the pressure chambers 12 adjacent to these channels is also heated. Therefore, it is possible to effectively heat the ejection ports 13 adjacent to the pressure chambers 12 and the ink around the precipitates formed in the vicinities of the ejection ports 13. As a result, the precipitates are dissolved by the heated ink, so that the occurrence of ejection failures is suppressed.

Note that, as described above, the ejection module 300 is kept at a constant temperature by a temperature adjusting mechanism (not illustrated in the drawings). However, the heating parts 2102 are installed at positions closer to the ink circulating in the circulation channel than the temperature adjusting mechanism. Therefore, it is possible for the heating parts 2102 to heat the ink circulating in the circulation channel more efficiently than the above-described temperature adjustment mechanism.

Note that, in the present embodiment, although a pair of heating parts 2102 is installed between the supply connection channels 323 and collection connection channels 324 corresponding each other, there is not a limitation as such. That is, such a configuration equipped with either of the one heating part 2102*a* and the other heating part 2102*b* is also possible. Alternatively, the heating part 2102 may be configured with one member extending from a position adjacent to the supply connection channels 323 to a position adjacent to the collection connection channels 324 in the X direction.

In a case where the ink to be used is such an ink in which formed precipitates are easily re-dissolved by heat, it is preferable to start heating with the heating part 2102 before the ink is circulated by driving of the circulation pump 500 or almost at the same time as the circulation of the ink. By controlling the circulation of the ink and the driving of the heating part 2102 as described above, the ink can be circulated without impairing the circulation efficiency. Note that, in a case where precipitates formed at the ejection ports 13 and in their vicinities are re-dissolved by driving of the heating part 2102, it is preferable that the ejection port surface including the ejection module 300 of the liquid ejection head 1 is capped with the cap member 61 in advance. This capping makes it possible to heat the ink in the vicinity of precipitates while suppressing the evaporation of water (liquid components) from the ejection ports 13, so that the precipitates can be re-dissolved efficiently.

Further, regarding the ink to be used, in a case where formed precipitates are easily re-dissolved with solvent (e.g. water), it is preferable to drive the circulation pump 500 to circulate the ink before starting the heating with the heating part 2102 or almost at the same time as the heating. By controlling the circulation of the ink and the driving of the heating part 2102 as described above, it is possible to accelerate the re-dissolving of the precipitates for circulating the ink. Note that, also in a case where precipitates formed at the ejection ports 13 and in their vicinities are re-dissolved with the ink circulated by driving of the circulation pump 500, it is preferable that the ejection port surface including the ejection module 300 of the liquid ejection head 1 is capped with the cap member 61 in advance. This capping makes it possible to circulate the ink while suppressing the evaporation of water from the ejection ports 13, so that the precipitates can be re-dissolved efficiently.

Further, regarding the pair of heating parts 2102, the one heating part 2102*a* installed on the supply connection channel 323 side and the other heating part 2102*b* installed on the collection connection channel 324 side may have the same configuration or may have different configurations. The ejection ports 13 are installed adjacent to the pressure chambers 12. Therefore, by efficiently heating the ink on the supply connection channel 323 side, which is located on the upstream side of the pressure chambers 12, it is possible to supply ink at a higher temperature to the ejection ports 13 and their vicinities where precipitates are likely to be formed, which makes it easy to re-dissolve the precipitates.

Figure 22A:
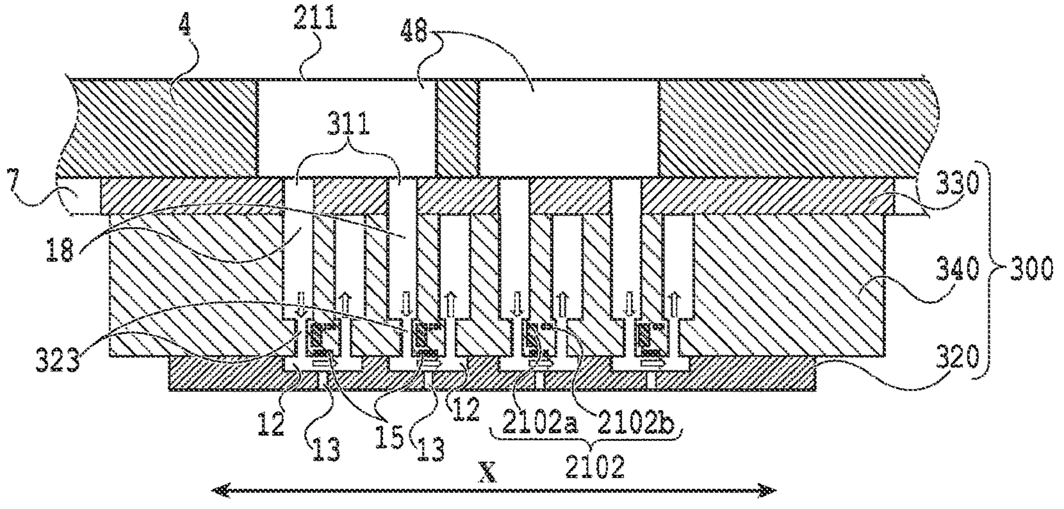
FIG. 22A to FIG. 22C are cross-sectional views of an ejection module equipped with a heating part of another form.
Figure 22B:
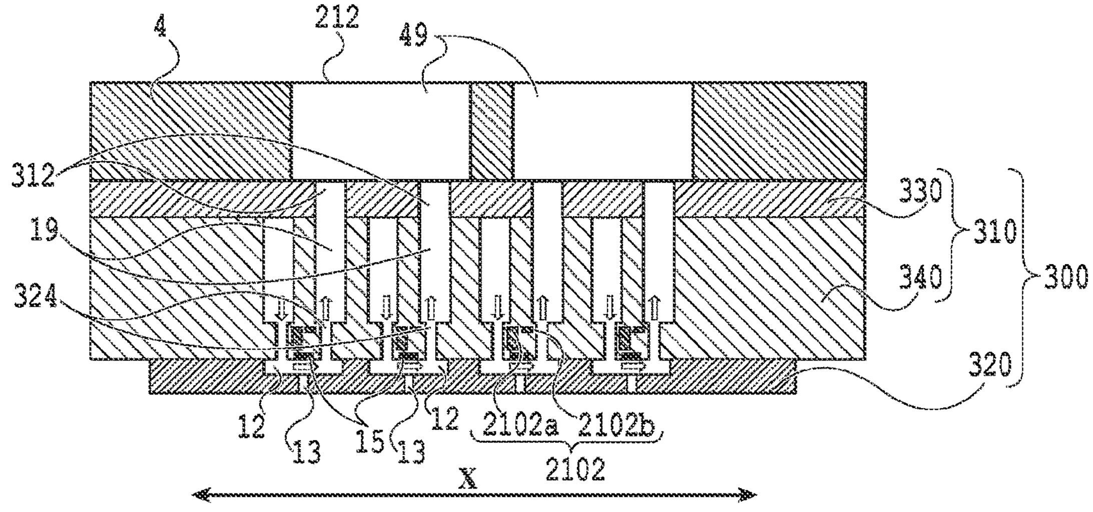
Figure 22C:
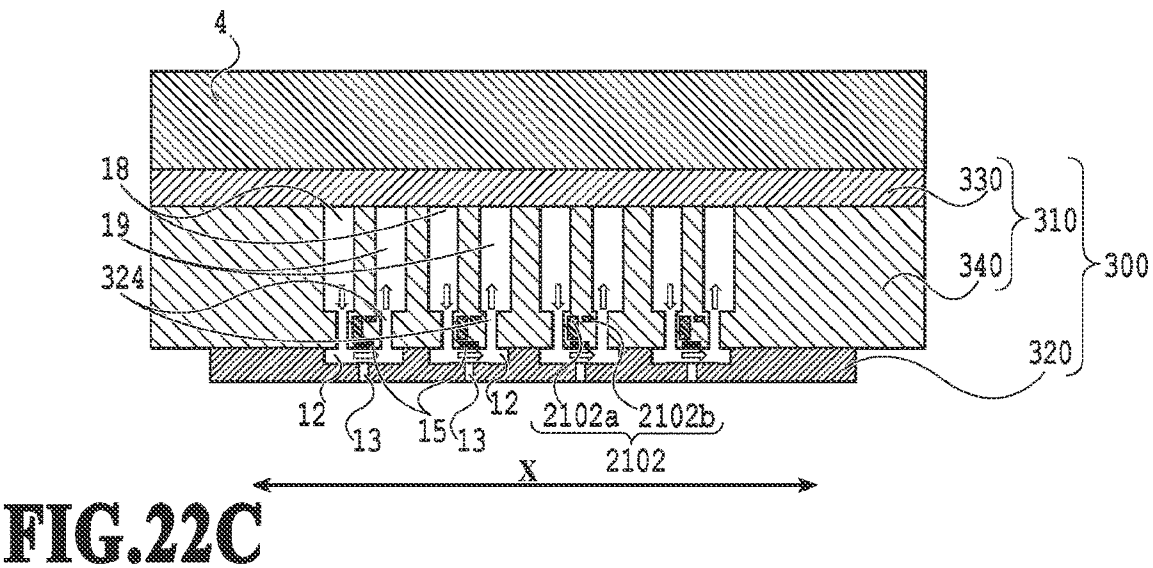

Therefore, it is also possible that the one heating part 2102*a* on the supply connection channel 323 side is configured to be capable of heating a wider range of the walls of the supply connection channels 323. Specifically, as illustrated in FIG. 22A to FIG. 22C, the one heating part 2102*a* may be formed to be wide in the height direction (Z direction). FIG. 22A to FIG. 22C are cross-sectional views of the ejection module 300 equipped with the heating part 2102 in a different form and the drawings correspond to FIG. 14A to FIG. 14C, respectively. That is, FIG. 22A is a cross-sectional view taken along line XIVA-XIVA of FIG. 11A, FIG. 22B is a cross-sectional view taken along line XIVB-XIVB of FIG. 11A, and FIG. 22C is a cross-sectional view taken along line XIVC-XIVC of FIG. 11A.

With such a configuration, the heating area of heating the ink in the supply connection channels 323 with the one heating part 2102*a* is widened, and thus the effect of heating the ink can be enhanced. The method for widening the heating area of the one heating part 2102*a* is not limited as such. For example, in a case where heating parts 2102*a* are intermittently arranged in the Y direction, the number of heating parts 2102*a* on one side may be larger than the number of heating parts 2102*b* on the other side. Alternatively, it is also possible that the heating area of the one heating part 2102*a* and the heating area of the other heating part 2102*b* match but the one heating part 2102*a* is configured with a member having a higher heating effect than the other heating part 2102*b*. Moreover, it is also possible that the one heating part 2102*a* and the other heating part 2102*b* have the same configuration and that the energy input to the one heating part 2102*a* is larger than the energy input to the other heating part 2102*b*.

Further, also in the present embodiment, as for the ink flowing through the circulation channel, for example, in a case where the sum of the contained pigment and resin particles is 10% or more of the total amount of the ink, the effect of reducing the viscosity by the heating part 2002 appears remarkably. Furthermore, in the case of a serial type printing apparatus, for the purpose of dispersing power consumption, it is desirable that the ink is heated by the heating part 2002 before performing scanning with the carriage 60, so that the temperature of the ink is heated up within the predetermined temperature range. Further, although a serial type printing apparatus is illustrated as an example in the present embodiment, the printing apparatus to which the present embodiment can be applied is not limited to the example and may be applied to what is termed as a full-line type printing apparatus. Furthermore, in the present embodiment, as with the first embodiment, a detection part is installed in the circulation channel, for example, and the driving of the pair of heating parts 2102 is controlled based on detection results of the detection part. Note that such a detection part is not necessarily installed in the circulation channel.

As explained above, in the present embodiment, the ink circulation channel including the ejection module 300 is configured inside the liquid ejection head 1, and the heating part 2102 is installed in this ejection module 300. Thus, the same functional effect as that of the first embodiment can be obtained.

Further, a pair of heating parts 2102 is installed at positions adjacent to the supply connection channels 323, which supply ink to the pressure chambers 12 adjacent to the ejection ports 13, and to the collection connection channels 324, which collect ink from the pressure chambers 12. Thus, the precipitates formed at the ejection ports 13 and in their vicinities can be efficiently re-dissolved by heating, and thus the occurrence of ejection failures can be suppressed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-080217, filed May 16, 2022, which is hereby incorporated by reference herein in its entirety.

What is claimed is:

1. A liquid ejection head comprising:

an ejection unit including an ejection element that generates ejection energy for ejecting supplied liquid;

a first pressure adjusting unit configured to be controlled to have a predetermined pressure;

a second pressure adjusting unit configured to be controlled to have a lower pressure than the predetermined pressure;

a pump configured to send liquid to outside of the pump; and a temperature adjusting unit configured to adjust a temperature of liquid, wherein a circulation channel for circulating liquid is configured at least with the ejection unit, the first pressure adjusting unit, the second pressure adjusting unit, the pump, and the temperature adjusting unit, and wherein, in the circulation channel, liquid supplied from outside flows into the first pressure adjusting unit and then flows out of the first pressure adjusting unit into the ejection unit and the second pressure adjusting unit, the liquid that has flowed out of the ejection unit and the liquid that has flowed out of the first pressure adjusting unit flow into the second pressure adjusting unit and then flow out of the second pressure adjusting unit into the pump, the pump sends the liquid that has flowed in from the second pressure adjusting unit to the first pressure adjusting unit, and the temperature of the circulating liquid is adjusted by the temperature adjusting unit.

2. The liquid ejection head according to claim 1, wherein the temperature adjusting unit is arranged on an upstream side relative to the pump with respect to a direction in which liquid flows as well as on a downstream side relative to the second pressure adjusting unit with respect to the direction.

3. The liquid ejection head according to claim 1, wherein the ejection unit includes:

an ejection port configured to eject liquid, a pressure chamber formed so as to correspond to the ejection element that generates energy for ejecting the liquid from the ejection port, a supply channel configured to supply liquid to the pressure chamber, and a collection channel configured to collect liquid from the pressure chamber, and wherein the temperature adjusting unit is installed at a position adjacent to the supply channel.

4. The liquid ejection head according to claim 3, wherein the temperature adjusting unit is installed at a position adjacent to both of the supply channel and the collection channel, and wherein the temperature adjusting unit exhibits a higher heating effect at a position adjacent to the supply channel than at a position adjacent to the collection channel.

5. The liquid ejection head according to claim 4, wherein the temperature adjusting unit is installed to have a wider range on a channel wall at the position adjacent to the supply channel than at the position adjacent to the collection channel.

6. The liquid ejection head according to claim 4, wherein, regarding the temperature adjusting unit, a plurality of temperature adjusting units are arranged at the position adjacent to the supply channel and the position adjacent to the collection channel, respectively, and a greater number of temperature adjusting units are arranged at the position adjacent to the supply channel than at the position adjacent to the collection channel.

7. The liquid ejection head according to claim 4, wherein the temperature adjusting unit inputs a greater amount of energy at the position adjacent to the supply channel than at the position adjacent to the collection channel.

8. The liquid ejection head according to claim 1, wherein the liquid that circulates in the circulation channel is an ink containing a pigment and resin particles, and wherein a sum of the contained pigment and resin particles of the ink is 10% or more of a total amount of the ink.

9. The liquid ejection head according to claim 1, wherein the circulation channel is formed of a resin member.

10. The liquid ejection head according to claim 1, wherein a volume of the circulation channel is less than 30 ml.

11. A liquid ejection apparatus including a liquid ejection head, the liquid ejection head comprising:

an ejection unit including an ejection element that generates ejection energy for ejecting supplied liquid;

a first pressure adjusting unit configured to be controlled to have a predetermined pressure;

a second pressure adjusting unit configured to be controlled to have a lower pressure than the predetermined pressure;

a pump configured to send liquid to outside of the pump; and a temperature adjusting unit configured to adjust a temperature of liquid, wherein a circulation channel for circulating liquid is configured at least with the ejection unit, the first pressure adjusting unit, the second pressure adjusting unit, the pump, and the temperature adjusting unit, and wherein, in the circulation channel, liquid supplied from an outside flows into the first pressure adjusting unit and then flows out of the first pressure adjusting unit into the ejection unit and the second pressure adjusting unit, the liquid that has flowed out of the ejection unit and the liquid that has flowed out of the first pressure adjusting unit flow into the second pressure adjusting unit and then flow out of the second pressure adjusting unit into the pump, the pump sends the liquid that has flowed in from the second pressure adjusting unit to the first pressure adjusting unit, and the temperature of the circulating liquid is adjusted by the temperature adjusting unit.

12. The liquid ejection apparatus according to claim 11, wherein the liquid is ejected while the liquid ejection head is moved in a predetermined direction.

13. The liquid ejection apparatus according to claim 12, wherein the temperature adjusting unit and the pump are driven before the liquid ejection head is moved in the predetermined direction.

14. A liquid ejection apparatus including a liquid ejection head, the liquid ejection head comprising:

an ejection unit including an ejection element that generates ejection energy for ejecting supplied liquid;

a first pressure adjusting unit configured to be controlled to have a predetermined pressure;

a second pressure adjusting unit configured to be controlled to have a lower pressure than the predetermined pressure;

a pump configured to send liquid to outside of the pump; and a temperature adjusting unit configured to adjust a temperature of liquid, wherein a circulation channel for circulating liquid is configured at least with the ejection unit, the first pressure adjusting unit, the second pressure adjusting unit, the pump, and the temperature adjusting unit, wherein, in the circulation channel, liquid supplied from an outside flows into the first pressure adjusting unit and then flows out of the first pressure adjusting unit into the ejection unit and the second pressure adjusting unit, the liquid that has flowed out of the ejection unit and the liquid that has flowed out of the first pressure adjusting unit flow into the second pressure adjusting unit and then flow out of the second pressure adjusting unit into the pump, the pump sends the liquid that has flowed in from the second pressure adjusting unit to the first pressure adjusting unit, and the temperature of the circulating liquid is adjusted by the temperature adjusting unit, wherein the ejection unit includes;

an ejection port configured to eject liquid, a pressure chamber formed so as to correspond to the ejection element that generates energy for ejecting liquid from the ejection port, a supply channel configured to supply liquid to the pressure chamber, and a collection channel configured to collect liquid from the pressure chamber, wherein the temperature adjusting unit is installed at a position adjacent to at least one of the supply channel and the collection channel, wherein a cap member configured to cap a surface of the liquid ejection head from which the liquid is ejected is provided, and wherein, in a case in which at least one of the pump and the temperature adjusting unit is being driven, the ejection unit is protected with the cap member.

* * * * *